United States Patent
Cho et al.

(10) Patent No.: US 9,829,337 B2
(45) Date of Patent: Nov. 28, 2017

(54) MOBILE TERMINAL AND METHOD FOR CONTROLLING THE SAME

(71) Applicant: LG ELECTRONICS INC., Seoul (KR)

(72) Inventors: Taehoon Cho, Seoul (KR); Jie Seol, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 14/930,306

(22) Filed: Nov. 2, 2015

(65) Prior Publication Data

US 2017/0003138 A1    Jan. 5, 2017

(30) Foreign Application Priority Data

Jul. 2, 2015 (KR) .......................... 10-2015-0094801

(51) Int. Cl.
*G01C 21/36* (2006.01)
*G06N 5/04* (2006.01)
*G01C 21/34* (2006.01)

(52) U.S. Cl.
CPC ..... *G01C 21/3626* (2013.01); *G01C 21/3484* (2013.01); *G01C 21/3664* (2013.01); *G01C 21/3676* (2013.01); *G06N 5/04* (2013.01)

(58) Field of Classification Search
CPC ............ G01C 21/3626; G01C 21/3664; G01C 21/3676; G06N 5/04
See application file for complete search history.

(56) References Cited

U.S. PATENT DOCUMENTS

| 7,477,989 | B2 | 1/2009 | Tomoda |
| 7,991,544 | B2* | 8/2011 | Singh ................. G01C 21/3484 |
| | | | 340/995.23 |
| 2008/0294337 | A1* | 11/2008 | Dawson ................. G01C 21/26 |
| | | | 701/533 |

(Continued)

FOREIGN PATENT DOCUMENTS

| KR | 2008-0013475 | 2/2008 |
| KR | 2008-0083401 | 9/2008 |

(Continued)

OTHER PUBLICATIONS

European Patent Application No. 15003455.1, Search Report dated Nov. 15, 2016, 10 pages.

*Primary Examiner* — Michael J Zanelli
(74) *Attorney, Agent, or Firm* — Lee, Hong, Degerman, Kang & Waimey PC

(57) ABSTRACT

Provided are a mobile terminal and a method of controlling the same. The mobile terminal includes a display unit configured to display a graphic object indicating information about a route between a source and a destination and a control unit configured to detect information about at least one recommended section corresponding to at least one of a plurality of sections included in the route information and display a graphic object indicating the route information and a graphic object indicating the detected recommended section information together in a visually distinct manner. The recommended section information is route information indicating a route through which at least one external terminal has traveled.

19 Claims, 24 Drawing Sheets

(56) References Cited

U.S. PATENT DOCUMENTS

| | | | |
|---|---|---|---|
| 2009/0088971 A1* | 4/2009 | Currie | G01C 21/32 |
| | | | 701/418 |
| 2009/0157312 A1* | 6/2009 | Black | G01C 21/30 |
| | | | 701/414 |
| 2010/0057340 A1* | 3/2010 | Kravets | G01C 21/3484 |
| | | | 701/416 |
| 2010/0145608 A1 | 6/2010 | Kurtti et al. | |
| 2012/0095681 A1* | 4/2012 | An | G01C 21/3484 |
| | | | 701/527 |
| 2014/0278064 A1 | 9/2014 | Lee et al. | |
| 2014/0288680 A1* | 9/2014 | Hoffman | G06K 9/00342 |
| | | | 700/91 |
| 2015/0046088 A1 | 2/2015 | Jang et al. | |
| 2016/0123743 A1* | 5/2016 | Sisbot | G01C 21/3461 |
| | | | 701/538 |

FOREIGN PATENT DOCUMENTS

| | | |
|---|---|---|
| KR | 2010-0001470 | 1/2010 |
| KR | 2012-0039444 | 4/2012 |
| KR | 2013-0012239 | 2/2013 |

* cited by examiner

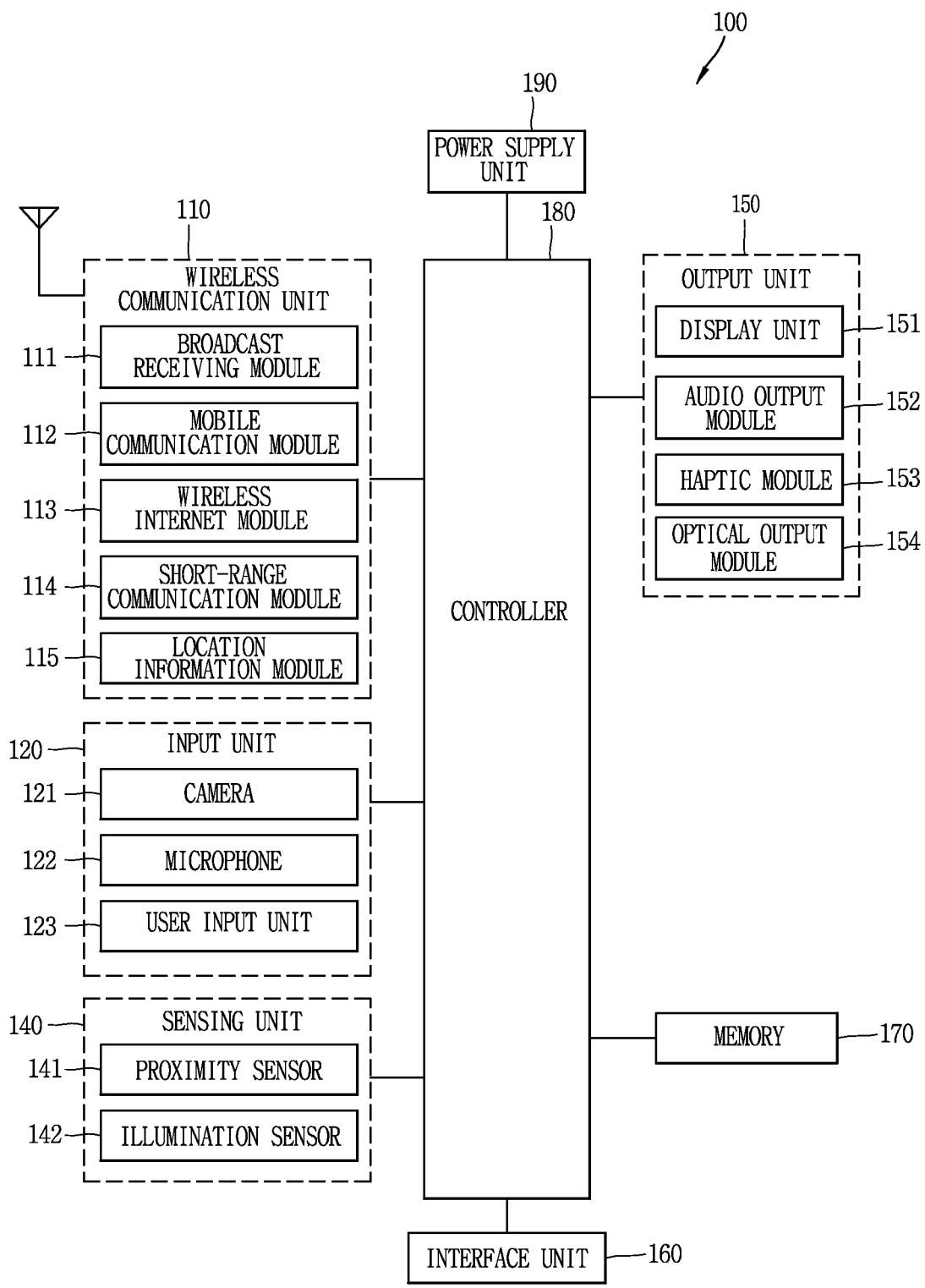

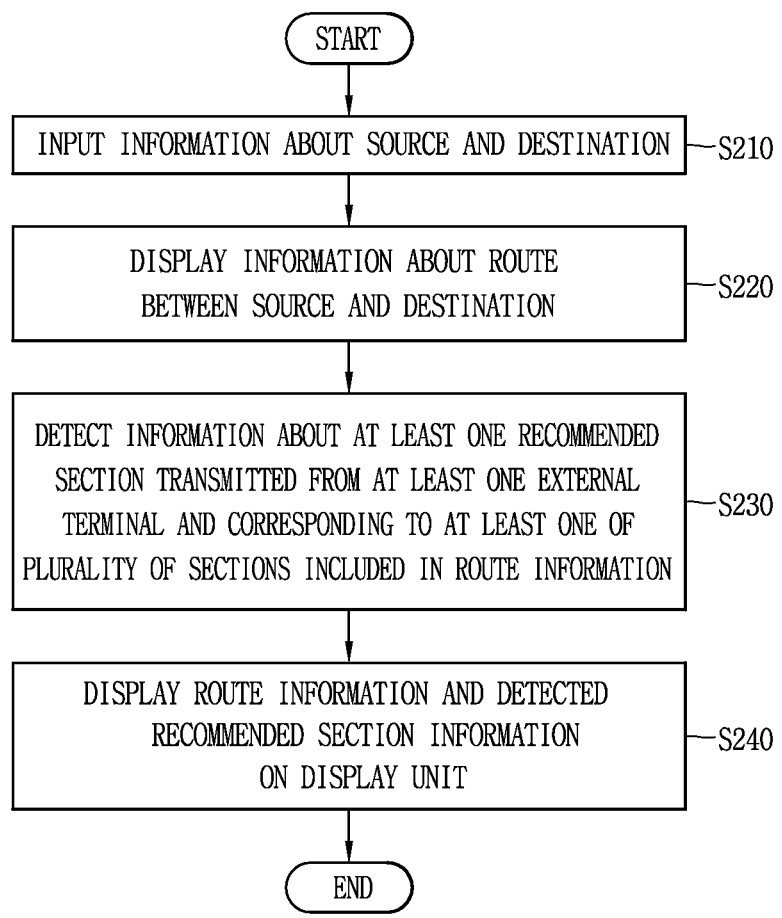

FIG. 7
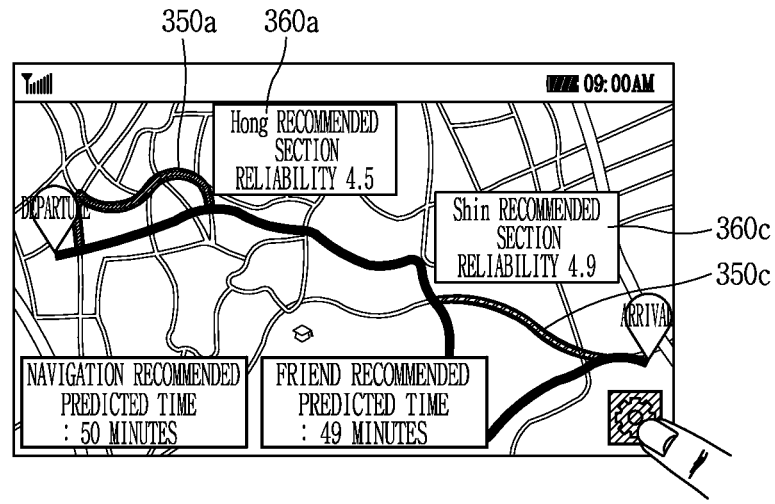
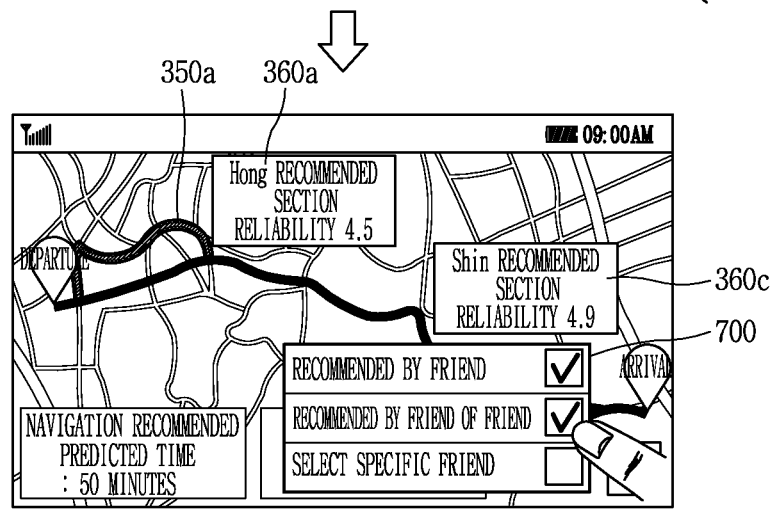
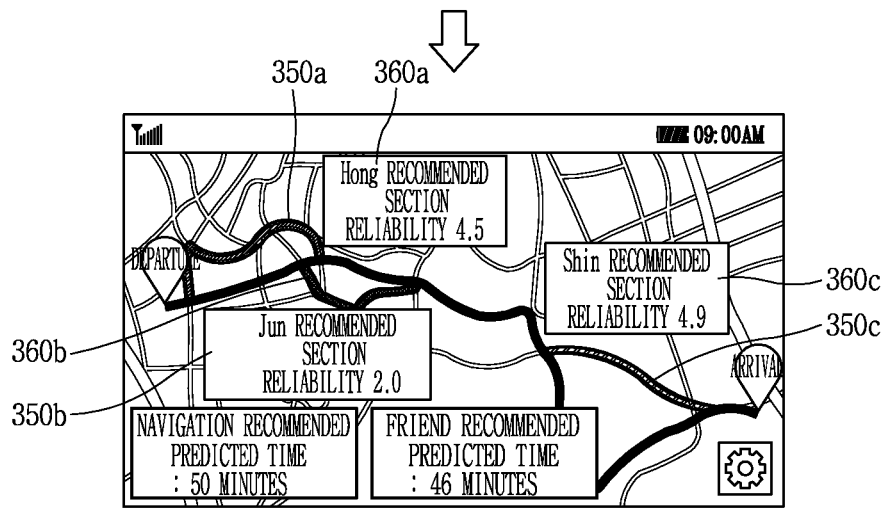

FIG. 14A
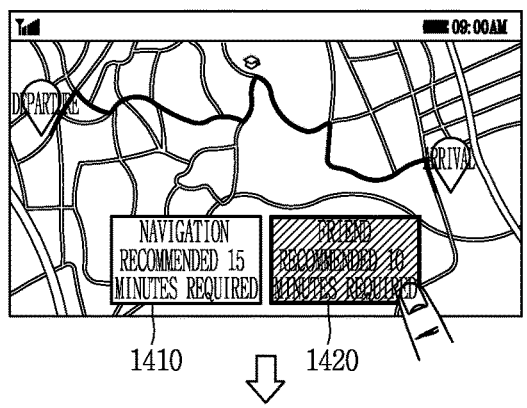
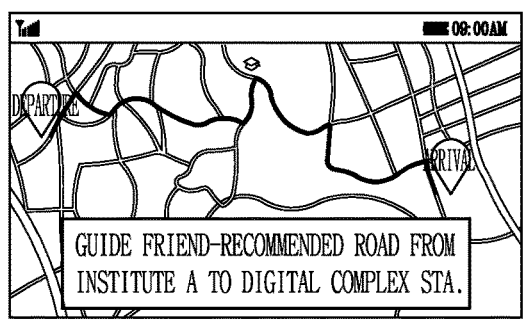
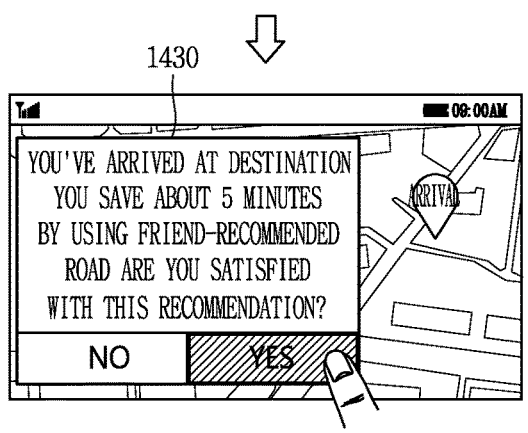
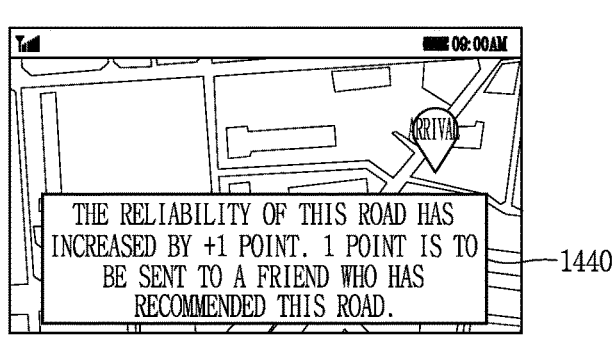

MOBILE TERMINAL AND METHOD FOR CONTROLLING THE SAME

CROSS-REFERENCE TO RELATED APPLICATION

Pursuant to 35 U.S.C. §119(a), this application claims the benefit of earlier filing date and right of priority to Korean Application No. 10-2015-0094801, filed on Jul. 2, 2015, the contents of which is incorporated by reference herein in its entirety.

BACKGROUND OF THE INVENTION

1. Field of the Invention

The present invention relates to a mobile terminal and a method for controlling the same.

2. Background of the Invention

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

Recently, functions of using a location of a mobile terminal to provide route information in various forms have been proposed. However, such route information provides only a route calculated by a computer program among routes included in a map. Such route information has difficulties in that information about alleys or byways is insufficient and not all road traffic conditions are reflected to every section included in the route information.

SUMMARY OF THE INVENTION

Therefore, an aspect of the detailed description is to provide information about an alley or byway that is not included in route information.

Another aspect is to provide information about a certain section between a source and a destination.

To achieve these and other advantages and in accordance with the purpose of this specification, as embodied and broadly described herein, there are provided a mobile terminal and a method of controlling the same. The mobile terminal includes a display unit configured to display a graphic object indicating information about a route between a source and a destination and a control unit configured to detect information about at least one recommended section corresponding to at least one of a plurality of sections included in the route information and display a graphic object indicating the route information and a graphic object indicating the detected recommended section information on the display unit together, in which the recommended section information is route information indicating a route through which at least one external terminal travels, and the control unit receives the recommended section information from the at least one external terminal.

The control unit may detect reliability of the recommended section information based on information associated with the at least one external terminal having transmitted the recommended section information and display a graphic object indicating the recommended section information in an output form determined based on the reliability.

The control unit may display a rod-shaped graphic object indicating a reliability value of the detected reliability on the display unit, set a reference reliability value based on a touch to the rod-shaped graphic object, and display a graphic object indicating only recommended section information having the reference reliability value or higher among the at least one recommended section on the display unit.

The reliability may be determined by at least one of identification information of the external terminals and the number of external terminals having transmitted the recommended section information. When new information associated with the at least one external terminal is received from the external terminal, the control unit may update the reliability based on the new information associated with the at least one external terminal and display a graphic object indicating the recommended section information in an output form determined based on the updated reliability.

The mobile terminal may further include a memory configured to store identification information of the plurality of external terminals, wherein the control unit receives the recommended section information from at least one of an external terminal whose identification information is stored in the memory and another external terminal whose identification information is stored in a memory of the external terminal.

The control unit may display a graphic object indicating one or more recommended sections included in the recommended section information on the display unit based on a predetermined condition, and the predetermined condition may be a condition associated with at least one of reliability of the recommended section information, a time, identification information of the external terminal.

The mobile terminal may further include a memory configured to store identification information of the plurality of external terminals, wherein, when there is an external terminal having traveled between the same origin and the same destination among external terminals whose identification information is stored in the memory, the control unit receives information about a route through which the external terminal has traveled from the external terminal that has traveled between the same source and the same destination.

When there is information about a plurality of routes between the same source and the same destination, the control unit may display any one of the plurality of routes on the display unit based on a predetermined condition.

The predetermined condition may be a condition associated with at least one of time information, day information, road condition information, identification information of the external terminal, weather information, and reliability of the route information.

The mobile terminal may further include a location information unit configured to receive location information, in which, when the recommended section information is detected within a predetermined distance from a current distance sensed through the location information unit, the control unit outputs notification information for the recommended section information.

The mobile terminal may further include a location information unit configured to receive location information, in which the control unit creates route information based on the location information sensed by the location information unit and transmits the route information to the external terminal as recommended route information or recommended section information.

The control unit may start creating the recommended route information or recommended section information based on a user's request to create the recommended route information.

When the same route information is sensed a predetermined number of times, the control unit creates the sensed route information as the recommended route information.

The mobile terminal may further include a memory configured to store identification information of the plurality of external terminals, in which the control unit determines at least one external terminal to transmit the recommended route information from among the plurality of external terminals based on a user's selection.

The control unit may display a selection box for selecting one or more recommended sections included in the recommended section information on a region adjacent to a region where the recommended section information is displayed and may display new route information including the one or more recommended sections included in the recommended section information on the display unit.

The control unit may update reliability information of the at least one recommended section according to a user's input.

The control unit may set the one or more recommended sections such that one or more of the at least one recommended section is no more displayed when the route information is displayed, based on a user's selection.

There is also provided a method of controlling a mobile terminal including inputting information about a source and a destination, displaying information about a route between the source and the destination, detecting information about at least one recommended section corresponding to at least one of a plurality of sections included in the route information, and displaying a graphic object indicating the route information and a graphic object indicating the detected recommended section information together, in which the recommended section information is route information indicating a route through which at least one external terminal has traveled.

The method may further include detecting reliability of the recommended section information based on information associated with the at least one external terminal having transmitted the recommended section information, in which the recommended section information is displayed in an output form determined based on the reliability.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 1A is a block diagram illustrating a mobile terminal associated with an embodiment of the present invention;

FIG. 2 is a flowchart illustrating a control method that provides route information using additional section information received from an external terminal by a mobile terminal according to an embodiment of the present invention;

FIGS. 5, 6, and 7 are conceptual vices showing a method of providing recommended section information on the basis of a predetermined condition;

FIGS. 14A and 14B are conceptual views showing a method in a mobile terminal evaluates recommended section information and recommended route information when the mobile terminal has received the recommended section information and the recommended route information.

DETAILED DESCRIPTION OF THE INVENTION

Figure 1B:
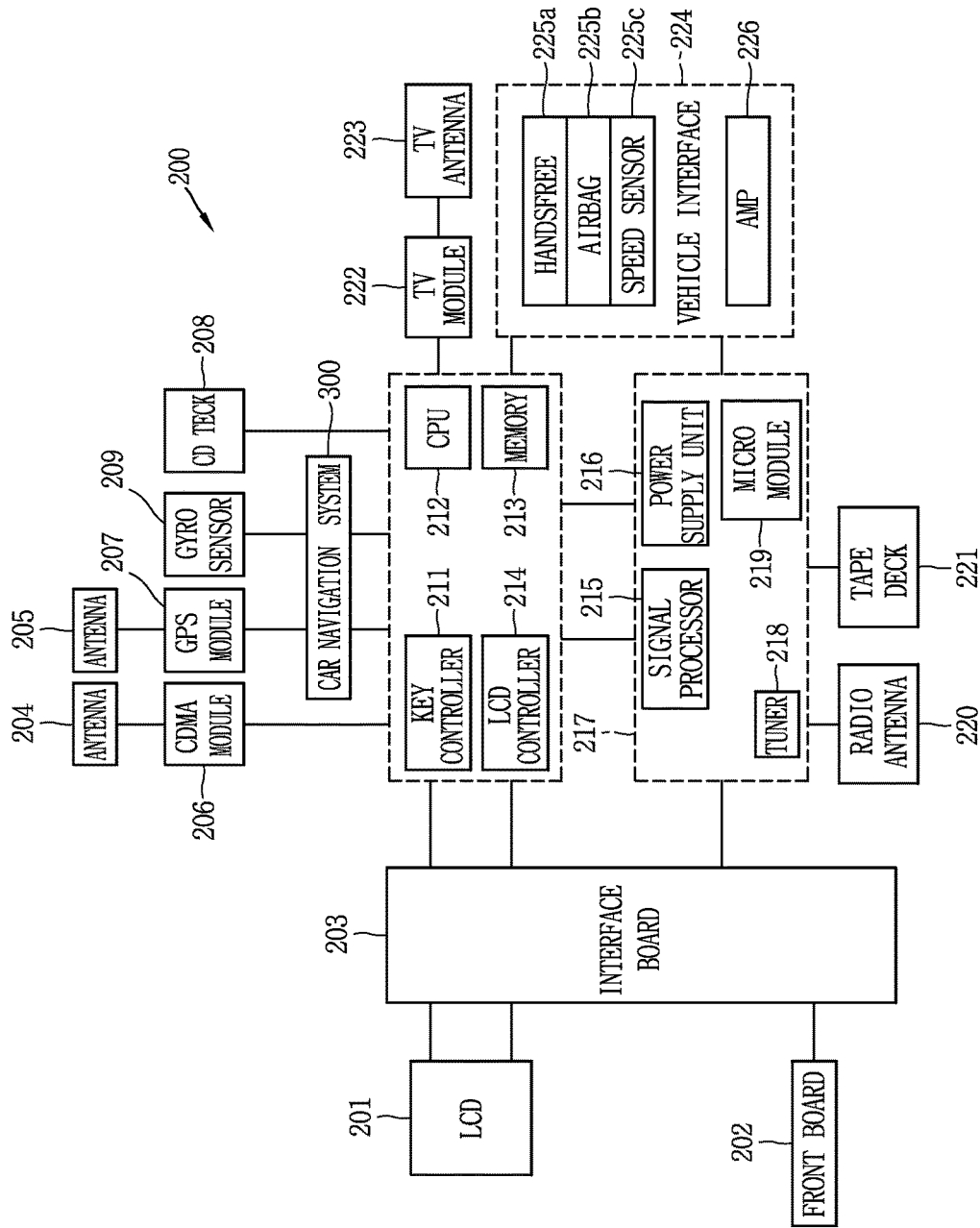
FIG. 1B is a block diagram illustrating a configuration of a telematics terminal having a communication terminal according to an exemplary embodiment disclosed in this specification.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Reference is now made to FIG. 1A, where FIG. 1A is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIG. 1A according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Hereinafter, description will be given of a configuration of the telematics terminal 200 having the communication terminal with reference to FIG. 1B.

FIG. 1B is a block diagram illustrating a configuration of a telematics terminal 200 having a communication terminal according to an exemplary embodiment disclosed in this specification.

As shown in FIG. 1B, the telematics terminal 200 may include a main board 210. The main board 210 may include a controller (for example, a central processing unit (CPU)) 212 for overall control of the telematics terminal 200, a memory 213 for storing various types of information, a key controller 211 for control of various types of key signals, and a liquid crystal display (LCD) controller 214 for control of LCD.

The memory 213 may store map information (map data) for displaying road guidance information on a digital map. Also, the memory 213 may store a traffic information collection control algorithm for allowing input of traffic information according to road conditions that a vehicle is currently traveling, and information for control of the algorithm.

The main board 210 may include a wireless communication module 206 for performing wireless communications between the telematics terminal 200 and a wireless communication system or between the telematics terminal 200 and a network in which the telematics terminal 200 is present, a location information module 207 for receiving a Global Positioning System (GPS) signal to guide a location of a vehicle, track a traveling route from a depart point to an arrival point, etc., or transmitting traffic information collected by a user using a GPS signal, a compact disk (CD) deck 208 for reproducing a signal recorded on a CD; a gyro sensor 209, and the like. The wireless communication module 206 and the location information module 207 may transmit and receive signals via corresponding antennas 204 and 205, respectively.

The wireless communication module 206 may include a mobile communication module 206a as a mobile communication terminal having a uniquely given device number for transmitting and receiving wireless signals with at least one of a base station, an external terminal and a sever over a mobile communication network, a wireless Internet module 206b for allowing wireless Internet access by technologies, such as Wireless LAN (WLAN), Wi-FI, Wireless broadband (Wibro), World Interoperability for Microwave Access (Wimax), High Speed Downlink Package Access (HSDPA) and the like, and a short-range communication module 206c for performing communications by technologies, such as Bluetooth, Radio Frequency IDentification (RFID), Infrared Data Association (IrDA), Ultra WideBand (UWB), ZigBee, Wireless LAN (protocols such as Bluetooth, 802.11n, etc.) and the like.

The broadcast receiving module 222 may be connected to the main board 210 to receive a broadcast signal via an antenna 223. The main body 210 may be connected, via an interface board 203, with a display (LCD) 201 controlled by the LCD controller 214, a front board 202 controlled by the key controller 211, and a camera 227 for capturing inside and/or outside of the vehicle. The display 201 may display various video signals, text signals and the like. The front board 202 may be provided with buttons for various types of key signal inputs, and provide a key signal corresponding to the user-selected button to the main board 210. Also, the display 201 may include the proximity sensor and the touch sensor (touch screen) shown in FIG. 2.

The front board 202 may include a menu key for allowing direct input of traffic information. The menu key may be controlled by the key controller 211.

An audio board 217 may be connected to the main board 210 to process various audio signals. The audio board 217 may include a microcomputer 219 for control of the audio board 217, a tuner 218 for receiving a radio signal, a power supply unit 216 for supplying power to the microcomputer 219, and a signal processor 215 for processing various audio signals.

The audio board 217 may also include a radio antenna 220 for receiving a radio signal, and a tape deck 221 for reproducing an audio tape. The audio board 217 may further include an audio output unit (for example, amplifier) 226 for outputting an audio (voice) signal processed in the audio board 217.

The audio output unit (amplifier) 226 may be connected to a vehicle interface 224. That is, the audio board 217 and the main board 210 may be connected to the vehicle interface 224. The vehicle interface 224 may also be provided for connection of a handsfree 225a for inputting a voice signal, an airbag 226b for safety of a passenger, a speed (velocity) sensor 225c for detecting the vehicle speed, and the like. The speed sensor 225c may calculate the vehicle speed and provide the calculated speed information to the controller (CPU) 212.

A navigation session 300 applied to the telematics terminal 200 may generate road guidance information based upon map data and current location information related to the vehicle, and notify a user of the generated road guidance information.

The display 201 may detect a proximity touch within a display window via a proximity sensor. For example, the display 201 detects a location of a proximity touch when a pointer (for example, a finger or a stylus pen) generates the proximity touch, and outputs location information corresponding to the detected location to the controller 212.

A voice recognition device (or voice recognition module) 301 may recognize a user's voice, and perform a corresponding function according to the recognized voice signal.

The navigation session 300 applied to the telematics terminal 200 may display a travel path on map data.

Hereinafter, embodiments about a control method of the mobile terminal 100 or the telematics terminal 200 will be explained with reference to the attached drawings.

The attached drawings will be explained clockwise based on the left upper drawing, or from the top to the bottom.

The following description will be provided by an example of a mobile terminal, but embodiments of the present invention may be applied to a telematics terminal in the same manner.

Figure 3A:
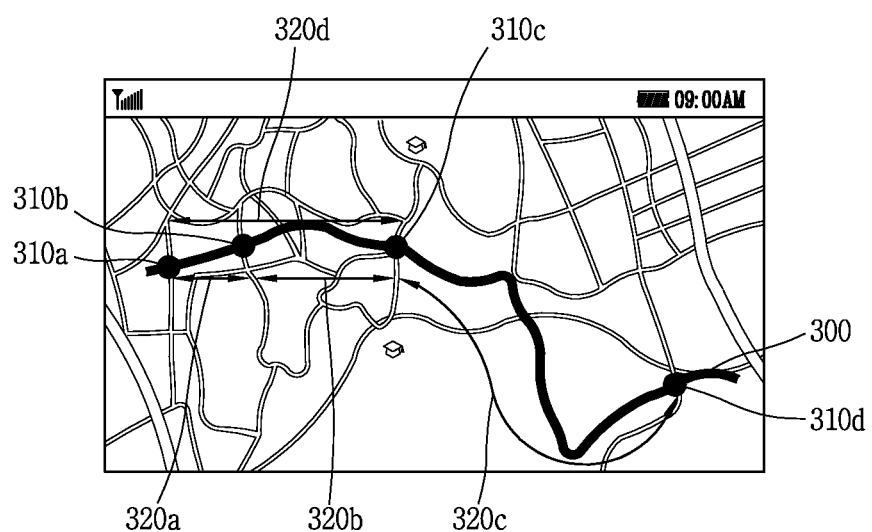
FIGS. 3A and 3B are conceptual views showing the control method of FIG. 2 by a mobile terminal according to an embodiment of the present invention.
Figure 3B:
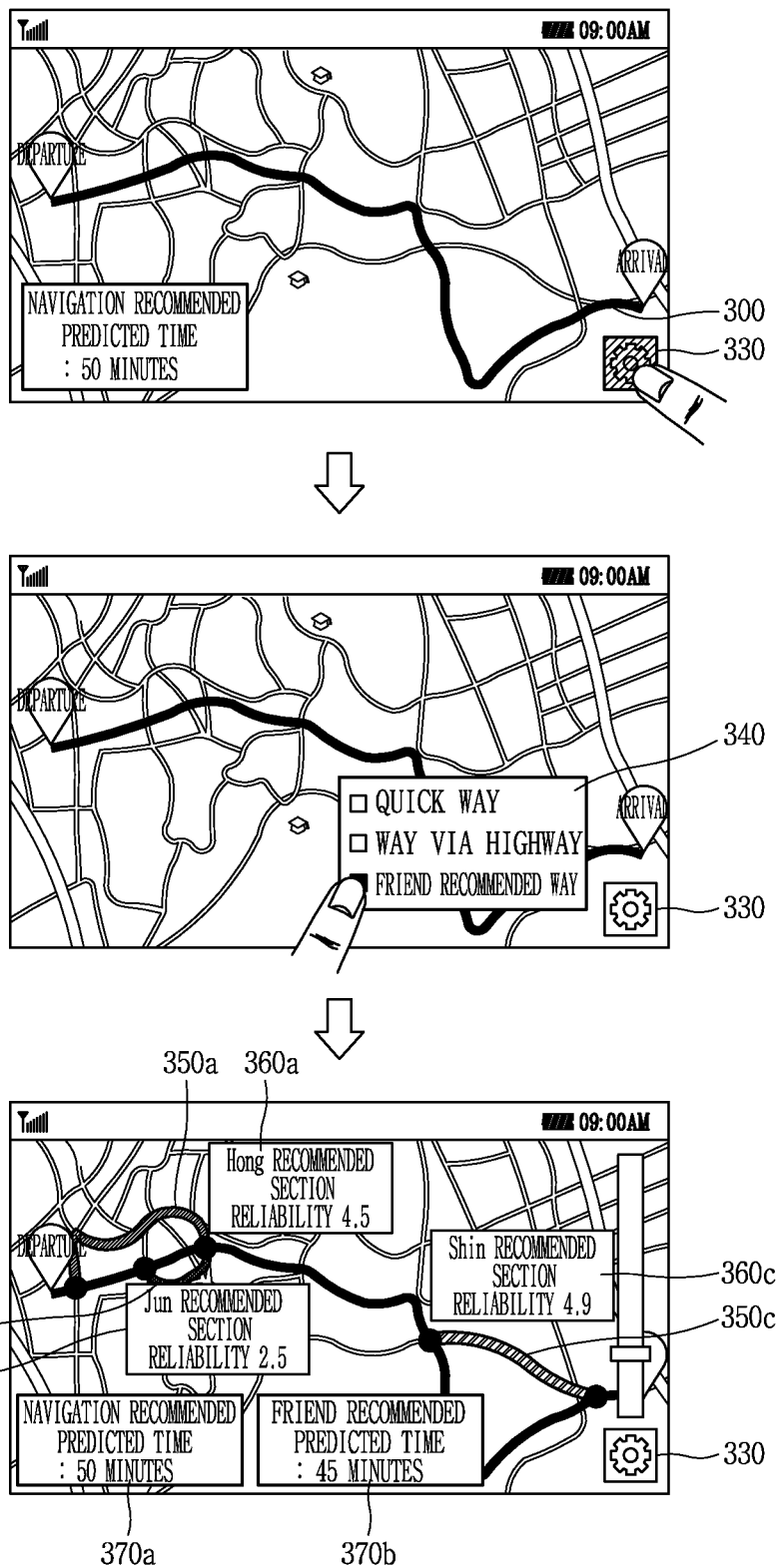

FIG. 2 is a flowchart illustrating a control method that provides route information using additional section information received from an external terminal, by a mobile terminal according to an embodiment of the present invention. FIGS. 3A and 3B are conceptual views showing the control method of FIG. 2 by a mobile terminal according to an embodiment of the present invention.

First, the mobile terminal according to an embodiment of the present invention proceeds to a step of receiving an input of information about a source and a destination from a user (S210).

The mobile terminal according to an embodiment of the present invention may further include a location information unit 115 configured to acquire location information. As described above, the location information unit 115 may be a Global Positioning System (GPS) module, or the like.

In addition, the mobile terminal according to an embodiment of the present invention may further include a memory 170 configured to store map information. The map information may be received from an external server through a network.

A control unit 180 of the mobile terminal according to an embodiment of the present invention may execute a function of providing route information corresponding to the user's request or a predetermined condition.

The function of providing route information may be a function of detecting at least one route between a source and a destination on the basis of the map information and the location information and displaying the detected route.

When there is the user's request to execute the function of providing the route information, the control unit 180 may execute the function of providing the route information. For example, the control unit 180 may execute the function of providing the route information in response to a touch applied to an icon linked to the function of providing the route information displayed on the display unit 151.

Alternatively, the control unit 180 may execute the function of providing the route information on the basis of satisfaction of a predetermined condition. The predetermined condition may be that it is sensed that a vehicle is positioned within a predetermined radius of the mobile terminal or that it is sensed that the mobile terminal moves at a predetermined speed or higher. For example, on the basis of a fact that the mobile terminal moves at a speed of 80 km/h or higher, the control unit 180 may display notification information for executing the function of providing the route information or may execute the function of providing the route information without displaying the notification information.

When the function of providing the route information is executed, the control unit 180 may receive information about a source and a destination from the user. The information about the source and the destination may be received through at least one of a voice input, a touch input, and a keyboard input.

After the information about the source and the destination is input, the mobile terminal according to an embodiment of the present invention may proceed to a step of displaying information about a route between the source and the destination (S220).

The control unit 180 may detect information about at least one route between the source and the destination on the basis of the location information acquired through the location information unit 115 and the map information stored in the memory 170.

The route information may be route information corresponding to different conditions. For example, the route information may include at least one of a route having the shortest distance between the source and the destination, a route passing through a highway, a route having the shortest travel time, a route recommended by a friend, and a route recommended by a friend of a friend.

The route information may include a route that does not include a narrow road such as an alley. That is, the route information may be a route in which a roadway is preferentially detected. Accordingly, the route information may include an alley, a byway, a shortcut, or a sidewalk only when the roadway is not detected. Accordingly, the route information may include an alley, a byway, a shortcut, or a sidewalk as long as the roadway is not detected.

The control unit 180 may select any one route from among the at least one route on the basis of the user's selection. In this case, the control unit 180 may display a graphic object indicating information about the selected route on the display unit 151 in addition to the map information.

When the route is selected, the mobile terminal according to an embodiment of the present invention may proceed to a step of detecting information about at least one recommended section that is transmitted from at least one external terminal in which the at least one recommended section corresponds to at least one of a plurality of sections included in the route information (S230).

The control unit 180 may detect the recommended section information in various ways. For example, the control unit 180 may detect the recommended section information in any one of a first way to detect the recommended section information with respect to respective separated sections and a second way to detect the recommended section information through route information having the same source and the same destination.

Respective ways will be described below in detail.

First, the control unit 180 may separate the route information and detect the recommended section information in the first way to detect the recommended section information for each separated section.

To this end, when information about any one route between the source and the destination is selected, the control unit 180 may separate the route information into a plurality of sections.

In order to separate the route information into the plurality of sections, the control unit 180 may detect a plurality of junctions included in the route information. Here, the junction may denote a start point where a road included in the route information splits into two or more. For example, as shown in FIG. 3A, the control unit 180 may detect a plurality of junctions 310*a*, 310*b*, 310*c*, and 310*d* included in the route information.

Subsequently, the control unit 180 may set a section between any two of the detected plurality of junctions. For example, as shown in FIG. 3A, the control unit 180 may set a first section 320*a* between the first junction 310*a* and the second junction 310*b*. Likewise, the control unit 180 may set a second section 320*b* between the second junction 310*b* and the third junction 320*c* and a third section 320*c* between the third junction 320*c* and the fourth junction 320*d*. In addition, the control unit 180 may set a fourth section 320*d* between the first junction 310*a* and the third junction 310*c*.

Thus, the control unit 180 may use the plurality of junctions to separate the route information 300 into the plurality of sections 320*a*, 320*b*, 320*c*, and 320*d*.

The control unit 180 may detect two of the plurality of junctions on the basis of a predetermined condition and may set one section between the two detected junctions. The predetermined condition may be that a minimum distance of the section between the junctions is equal to or greater than a predetermined value and a maximum distance thereof is equal to or less than a predetermined value. Thus, the selected route information may include a plurality of sections that are set according to the predetermined condition.

The plurality of sections may partially overlap one another. For example, as shown in FIG. 3A, a first section 320*a* among the plurality of sections may partially overlap the fourth section 320*d*.

In addition, the control unit 180 may detect other recommended section information having the same start point and end point as or a different route from the at least one section in which the recommended section information corresponds to at least one of the plurality of sections. That is, the recommended section information may be information about a route having the same start point and end point and passing through a different road. It can be understood that the recommended section information has the same meaning as the term "alley," "byway," or "shortcut."

The control unit 180 may detect information about at least one recommended section corresponding to each section. That is, information about at least one recommended section having the same start point and the same end point may be detected for each section. The start point may denote a point where each section is started, and the end point may denote a point where each section is ended.

The recommended section information indicating the recommended section may be transmitted from at least one predetermined external terminal or a predetermined external server.

The at least one predetermined external terminal may be an external terminal having identification information include in contact information stored in the memory 170. The contact information may be identification information of the external terminal. For example, the contact information may include a phone number, a serial number, an email addresses, and an identification (ID).

The at least one predetermined external terminal may be an external terminal predetermined by a user among external terminals included in the contact information. That is, the user may predetermine an external terminal to receive recommended section information.

The predetermined external server may be a server that collects and provides traffic information. The traffic information may be traffic condition information, traffic accident information, etc. In addition, the predetermined external server may be a server that receives route information indicating a recommended section from a plurality of external terminals through a network and transmits the route information to a predetermined external terminal. In this case, the predetermined external server may further include a memory that stores the route information indicating the recommended section.

The recommended section information may be the route information indicating a direct travel route of an external terminal having transmitted the recommended section information. For example, the recommended section information may be route information indicating a travel route in which an external terminal has traveled through an alley in a certain section. Accordingly, the recommended section information may be route information indicating an alley, shortcut, or byway in a certain section that is known only by the user of the external terminal.

A case in which the recommended section information is received from an external terminal will be described below. However, the present invention may be applied to a case in which the recommended section information is received from an external server.

Unlike this, the control unit 180 may detect the recommended section information in the second way.

To this end, although not shown, the control unit 180 may receive information about at least one route having the same source and destination as the selected route from the external terminal. In this case, the route information received from the external terminal may be route information indicating a direct travel route of the external terminal.

After receiving the route information, the control unit 180 may compare the selected route information with the route information received from the external terminal. As a result of the comparison, the control unit 180 may detect at least one certain section including different routes. In this case, the control unit 180 may set the detected certain section as the recommended section information. Thus, the present invention may provide an alley or byway as the direct travel route of the external terminal.

After the recommended section information is detected, the mobile terminal according to an embodiment of the present invention may proceed to a step of displaying the route information and the detected recommended section information on the display unit in a visually distinct manner (S240).

After the recommended section information is detected, the control unit 180 may detect reliability of the recommended section information. The reliability may be evaluation information for the recommended section information. The reliability may be calculated as a number. For example, the reliability may have a minimum value of 0, a maximum value of 10, and a value ranging between 0 and 10.

The control unit 180 may calculate reliability of each section on the basis of information associated with the recommended section information. In detail, the control unit 180 may detect the reliability of each section on the basis of a user input value, information associated with an external terminal, a travel time, a travel date, a travel day, a travel weather, and a road condition. The user input value may be a value that is directly input by the user. Information associated with the external terminal may include at least one of identification information of the external terminal and the number of external terminals that transmit the recommended section information. In this case, the control unit 180 may calculate the reliability on the basis of at least one of the identification information of the external terminal and the number of external terminals that transmit the recommended section information. For example, the control unit

180 may calculate reliability of recommended section information received from an external terminal having predetermined identification information, which is higher than reliability of recommended section information received from another external terminal. As another example, the control unit 180 may calculate the reliability in proportion to the number of external terminals that transmit the recommended section information.

The travel time may be a time taken for the external terminal that has transmitted the recommended section information to travel through the recommended section. That is, when a travel time of the recommended section corresponds to a current time, the control unit 180 may calculate high reliability of the recommended section information. On the other hand, when the travel time of the recommended section does not correspond to the current time, the control unit 180 may calculate low reliability of the recommended section information. Likewise, the travel date, the travel day, and the weather may be defined in the same way.

The road condition is traffic condition information for the recommended section information and may be received from an external terminal or an external server. For example, the road condition may include traffic flow information, road construction information, etc.

In addition, the control unit 180 may display a graphic object indicating the selected route information on the display unit 151 in addition to a graphic object corresponding to the recommended section information on the basis of the user's request. For example, as shown in the first figure in FIG. 3B, the control unit 180 may display a graphic object 330 indicating a function associated with route information, in addition to map information and a graphic object 300 indicating route information. The route information may be displayed overlapping the map information.

In this case, as shown in the second figure of FIG. 3B, the control unit 180 may display a route setting list 340 including at least one item indicating the function associated with the route information in response to a touch applied to the traffic object 330 indicating the function associated with the route information.

For example, as shown in the second figure of the FIG. 3B, the function associated with the route information included in the route setting list 340 may include a function of displaying a route of the shortest distance, a function of displaying a route passing through a highway, and a function of displaying a friend-recommended route.

When the function of displaying the friend-recommended route is selected, the control unit 180 may display a graphic object indicating the recommended section information received from an external terminal on the display unit 151.

In this case, the control unit 180 may display the selected route information and the recommended section information on the display unit 151 in a visually distinct manner. That is, the control unit 180 may display the graphic object indicating the recommended section information in the different output form from the graphic object indicating the route information. The output form is a visual appearance displayed on the display unit and may include an output color, output thickness, and output shape of the graphic object. For example, the control unit 180 may display the graphic object indicating the recommended section information in a green color and display the graphic object indication the route information in a red color.

The control unit 180 may determine the output form of the graphic object indicating the recommended section information on the basis of the reliability. In detail, the control unit 180 may display the graphic object indicating the recommended section information with a greater thickness or in a lower brightness color as the reliability of the recommended section information increases.

For example, as shown in the third figure of FIG. 3B, the control unit 180 may display a graphic object 350*a* indicating first recommended section information with a first thickness when the first recommended section information has first reliability and may display a graphic object 350*b* indicating second recommended section information with a second thickness when the second recommended section information has second reliability.

As another example, the control unit 180 may display the graphic object 350*a* indicating the first recommended section information in a first color when the first recommended section information has first reliability and may display the graphic object 350*b* indicating the second recommended section information in a second color when the second recommended section information has second reliability.

In addition, the control unit 180 may display section-related information on a region adjacent to a region where each section is displayed. The section-related information may include reliability information for the section, identification information of an external terminal having transmitted the section, road condition information (e.g., the presence of road construction) of the section, etc. For example, as shown in the third figure in FIG. 3B, the map information, the graphic object 300 indicating the route information, the graphic objects 350*a*, 350*b*, and 350*c* indicating the recommended section information, and reliability information 360*a*, 360*b*, and 360*c* of the recommended sections may be displayed on the display unit 151. The graphic object 300 indicating the route information, the graphic objects 350*a*, 350*b*, and 350*c* indicating the recommended section information, and the reliability information 360*a*, 360*b*, and 360*c* of the recommended sections may be displayed overlapping one another on the map information.

In addition, the control unit 180 may determine whether to output the sections on the basis of reliability of the sections. For example, the control unit 180 may display only a section having reliability equal to or greater than a predetermined value on the display unit 151. Moreover, the control unit 180 may not display a section having reliability less than the predetermined value on the display unit 151.

When information about a plurality of recommended sections is detected, the control unit 180 may select information about at least one of the plurality of recommended sections on the basis of the user's request. In this case, the control unit 180 may create new route information including the selected recommended section information.

In addition, the control unit 180 may calculate a predicted travel time for the created new route information. In this case, the control unit 180 may display the predicted travel time for the new route information created by the user's request and also a predicted travel time for the old route information on the display unit 151 together. For example, as shown in the third figure in FIG. 3B, the control unit 180 may display a predicted travel time 370*a* for old route information and a predicted travel time 370*b* for new route information created by the user's request on the display unit 151 together. Accordingly, the user may easily compare the predicted travel time for the new route information including the recommended section information with the predicted travel time for the old route information.

On a condition that the recommended section information is detected, the control unit 180 may provide the recommended section information when providing the route information or may provide notification information for the recommended section information when the mobile terminal is positioned adjacent to a start point of the recommended section information. For example, when the mobile terminal is positioned within 500 meters from the start point of the recommended section information, the control unit 180 may provide notification information indicating the presence of the recommended section information.

The notification information may be provided in at least one of visual and auditory ways. For example, when the mobile terminal is positioned within 500 meters from a start point of any recommended section, the control unit 180 may output a voice message of "You are in a friend-recommended section." An another example, when the mobile terminal is positioned within 500 meters from a start point of any recommended section, the control unit 180 may display the recommended section information on the display unit 151.

The method of providing the recommended section information in addition to the route information has been described above. Thus, the present invention may provide a route faster than usual by sharing an alley or byway known to only several persons. The present invention may also provide an accuracy of the recommended section information by calculating reliability of the recommended section information.

A method of displaying the recommended section information will be described with reference to reliability will be described below. FIGS. 4A, 4B, 4C, and 4D are conceptual views showing a method of displaying recommended section information on the basis of reliability.

A control unit of a mobile terminal according to an embodiment of the present invention may receive information about at least one recommended section for route information between a source and a destination from an external terminal.

In addition, the control unit 180 may calculate reliability of the recommended section information. The calculation of the reliability has been described above and will be omitted. Alternatively, the control unit 180 may receive the reliability of each section when receiving the recommended section information.

The control unit 180 may display the recommended section information on the display unit 151 in addition to the map information and the route information. For example, as shown in FIG. 4A, map information, a graphic object 450 indicating the current location information, a graphic object 400 indicating the route information, and a graphic object 410 indicating the recommended section information will be displayed on the display unit 151.

The control unit 180 may output the route information and the recommended section information in a visually distinct manner. For example, as shown in FIG. 4A, the control unit 180 may output the route information 400 in a lower brightness color than the recommended section information 410. Accordingly, the user may intuitively recognize the route information and the recommended section information.

In this case, the control unit 180 may determine an output form of a graphic object indicating the recommended section information on the basis of the reliability. In detail, the control unit 180 may display first recommended section information having first reliability with a first thickness and second recommended section information having second reliability lower than the first reliability with a second thickness less than the first thickness.

Figure 4A:
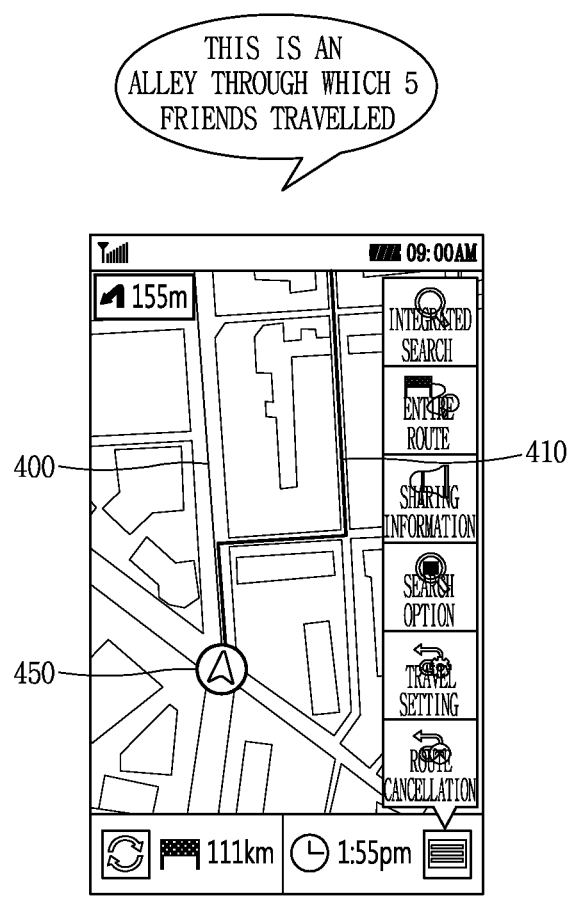
FIGS. 4A, 4B, 4C, and 4D are conceptual views showing a method of displaying recommended section information on the basis of reliability.
Figure 4B:
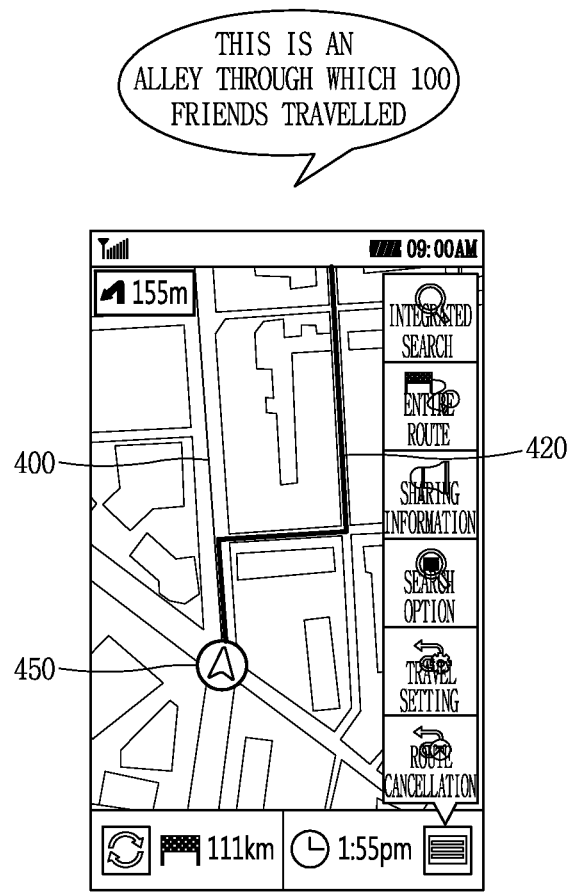

For example, as shown in FIGS. 4A and 4B, the control unit 180 may calculate the reliability of the recommended section information according to the number of external terminals that transmit the recommended section information. In more detail, the control unit 180 may set the reliability of the recommended section information as the first reliability when the number of external terminals that transmit the recommended section information is 5 and may set the reliability of the recommended section information as the second reliability higher than the first reliability when the number of external terminals that transmit the recommended section information is 100.

In this case, when the recommended section information has the second reliability rather than the first reliability, the control unit 180 may display the graphic object indicating the recommended section information with a greater thickness. For example, as shown in FIG. 4A, when the recommended section information has the first reliability, the recommended section information may be displayed with a first thickness. In addition, as shown in FIG. 4B, when the recommended section information has the second reliability, the recommended section information may be displayed with a second thickness.

In this case, when the mobile terminal is currently positioned within a predetermined distance from a start point of the recommended section information, the control unit 180 may output notification information for the recommended section information in addition to the recommended section information. The notification information may include reliability information and predicted travel time information of the recommended section information.

For example, as shown in FIGS. 4A and 4B, when the mobile terminal is positioned within 300 meters from the start point of the recommended section information, the control unit 108 may output a voice message of "An alley is detected through which 5 friends have traveled. If you travel through this route, you can save 3 minutes" or "An alley is detected through which 100 friends have traveled. If you travel through this route, you can save 5 minutes." Accordingly, the user may receive the alarm information for the recommended section information at an appropriate position while driving his/her vehicle.

The control unit 180 may update the reliability of the recommended section information in real time. That is, when information associated with the recommended section information is received from an external terminal in real time, the control unit 180 may calculate the reliability information again on the basis of the information associated with the recommended section information. In this case, the control unit may change an old reliability value of the recommended section information to a new reliability value that is calculated again.

Figure 4C:
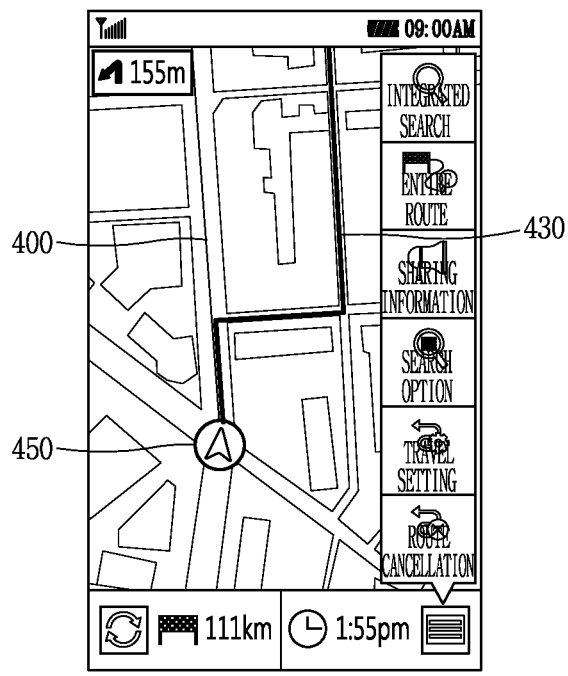

For example, as shown in FIG. 4C, the control unit 180 may display a graphic object 400 indicating route information and a graphic object 430 indicating information about any one recommended section on the display unit 400. In this case, the control unit 180 may display the graphic object 400 indicating the route information and the graphic object 430 indicating the recommended section information in different output forms.

In addition, the control unit 180 may compare a predicted travel time of the route information and a predicted travel time of route information including the recommended section information and display information about the route having the shorter predicted travel time with a greater thickness.

When the information associated with the recommended section information is received, the control unit 180 may calculate the reliability of the recommended section information again. For example, when information indicating that the at least one recommended section is under construction is received, the control unit 180 may calculate reliability lower than the old reliability. In this case, the control unit 180 may update the reliability of the recommended section information.

Figure 4D:
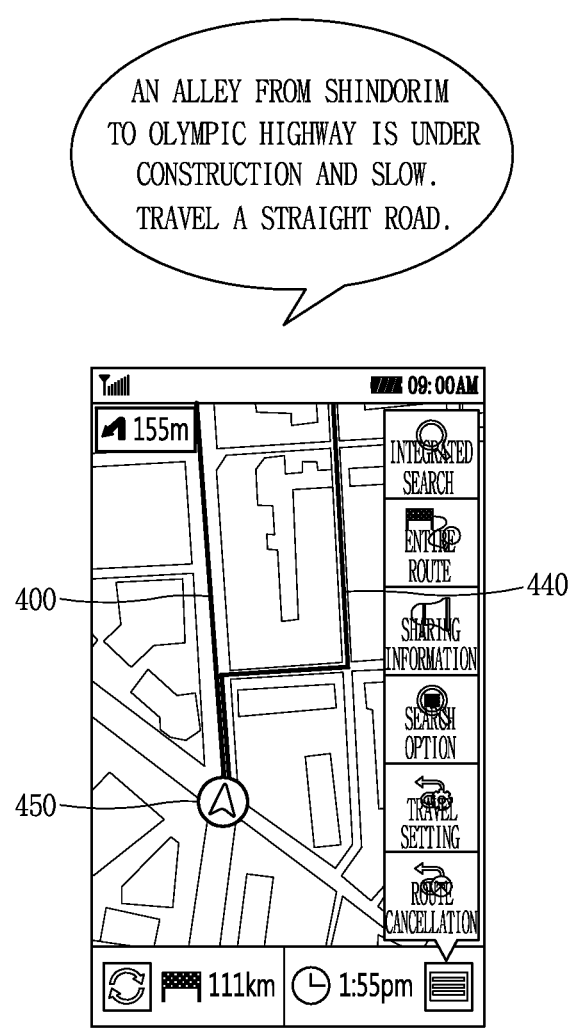

In addition, the control unit 180 may change the output form of the graphic object indicating the recommended section information on the basis of the updated reliability. For example, as shown in FIGS. 4C and 4D, when the reliability of the recommended section information is changed to the lower reliability, the control unit 180 may lower and output the brightness of a graphic object 440 indicating the recommended section.

In addition, the control unit 180 may display the graphic object 400 indicating the route information in a darker color than the graphic object 440 indicating route information including the recommended section information on the basis of the updated reliability. In addition, the control unit 180 may provide notification information indicating that a recommended section is under construction. For example, as shown in FIG. 4D, the control unit 180 may output a voice message of "An alley from Shindorim to Olympic highway is under construction. Travel through a straight road." as the notification information.

The method of determining the output form of the recommended section information has been described above on the basis of the reliability. Thus, the user may intrusively determine the reliability of the recommended section information.

Figure 5:
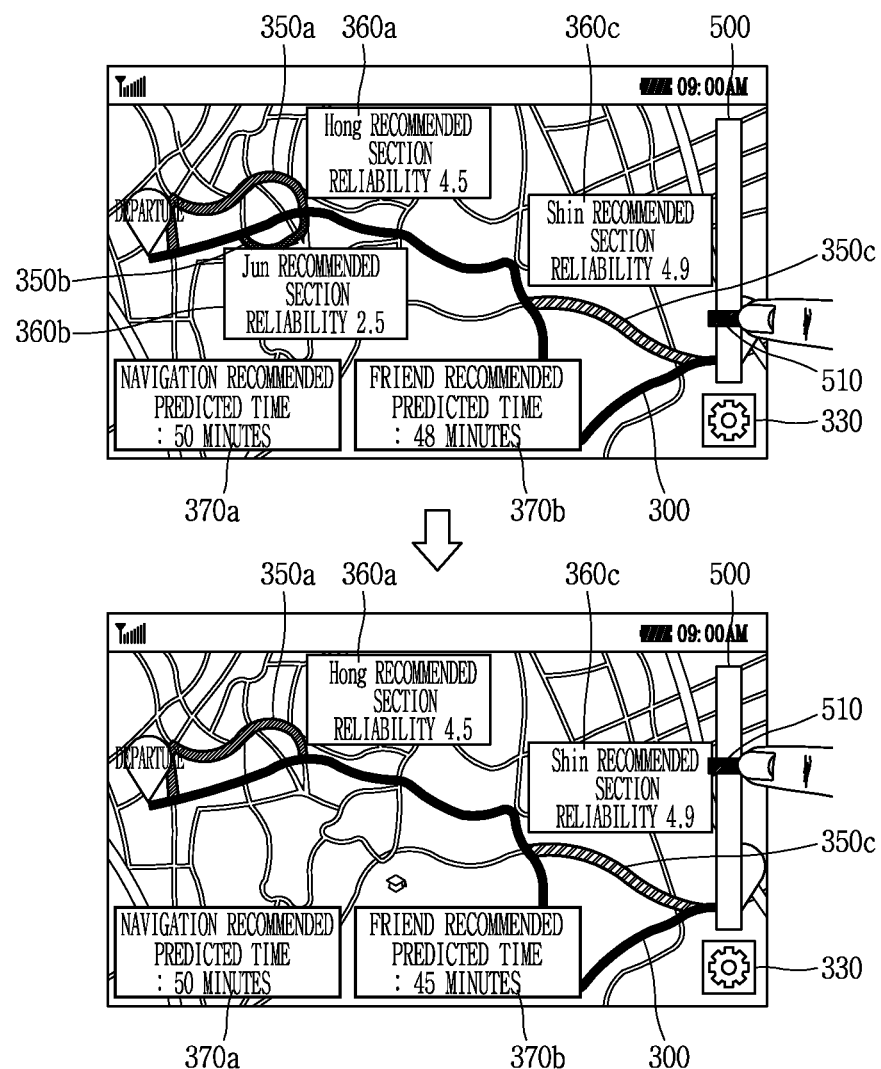
Figure 6:
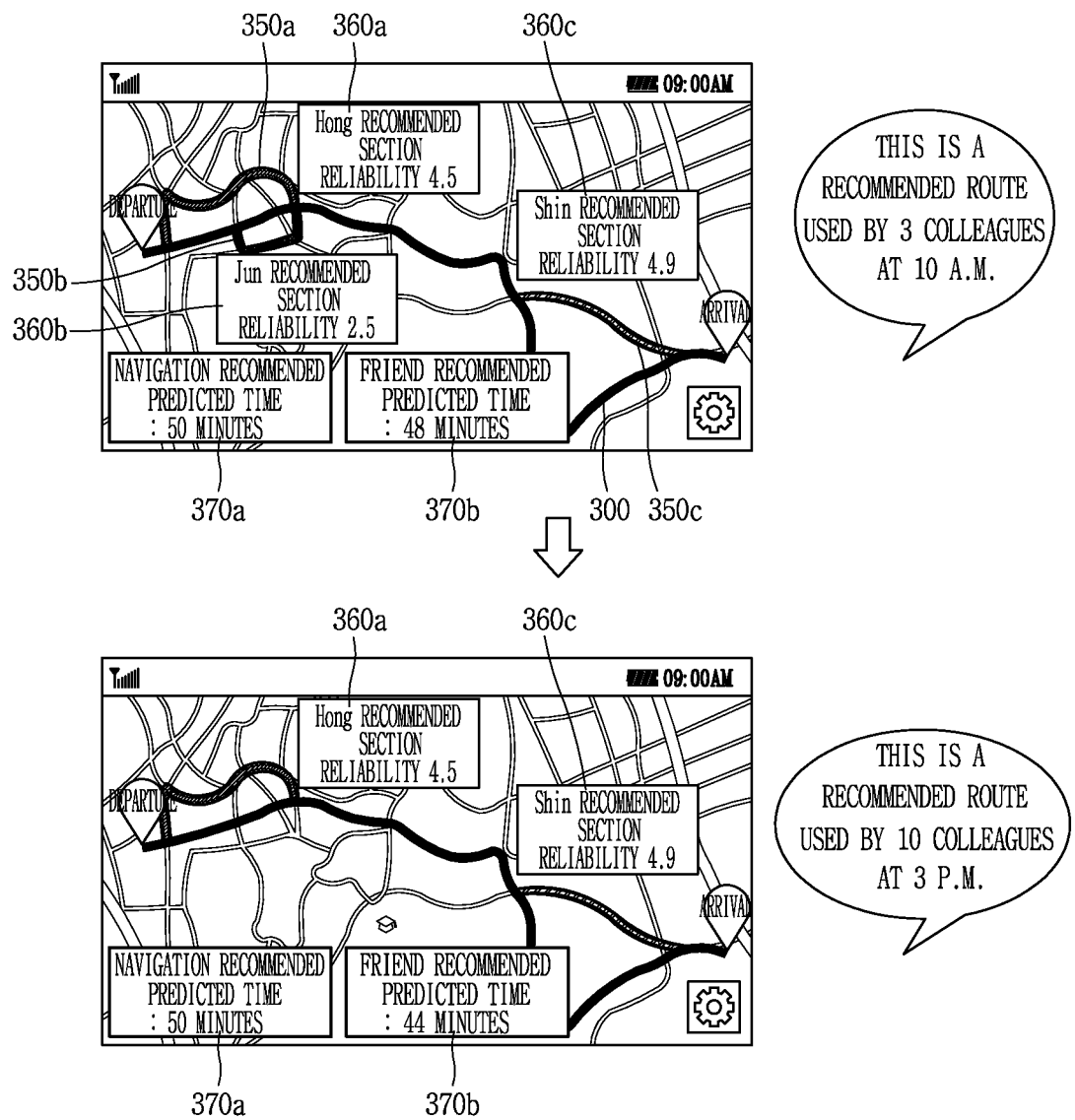

A method of providing the recommended section information on the basis of a predetermined condition will be described below. FIGS. 5, 6, and 7 are conceptual vices showing a method of providing recommended section information on the basis of a predetermined condition.

A control unit 180 of a mobile terminal according to an embodiment of the present invention may set a recommended section to be displayed on the display unit 151 among at least one recommended section on the basis of a predetermined condition.

The predetermined condition may include at least one of a condition associated with reliability of each section, a condition associated with a time, and a condition associated with an external terminal that provides recommended section information.

For example, the control unit may display only information about a recommended section having reliability equal to or greater than a reference reliability value out of information about the at least one recommended section on the display unit 151.

In this case, the control unit 180 may set the reference reliability value on the basis of a user's selection. For example, as shown in FIG. 5, map information, a graphic object 300 indicating the route information, graphic objects 350a, 350b, and 350c indicating the recommended section information, and graphic objects 500 and 510 for setting the reference reliability value may be displayed on the display unit 151.

As shown in FIG. 5, the graphic objects for setting the reference reliability value may include a rod-shaped graphic object 500 indicating a reliability value and a cursor 510 for determining the reliability value. In detail, the graphic objects for setting the reference reliability value may include a rod-shaped graphic object corresponding to a value ranging from a minimum reliability value to a maximum reliability value and the cursor 510 indicating a degree of the reliability value on the basis of a user's touch.

The control unit 180 may set, as the reference reliability value, a reliability value corresponding to a region in which a touch is applied to the graphic objects for setting the reference reliability value. For example, as shown in the first figure of FIG. 5, when a touch is applied to the graphic object 510 for setting the certain value, the control unit 180 may set, as the reference reliability value, a reliability value corresponding to the region in which the touch is applied and may display the graphic objects 350a, 350b, and 350c indicating the recommended section information with reliability equal to or greater than the reference reliability value on the display unit 151.

In this case, when it is sensed that another region in which a touch is applied to graphic object 510 for setting the certain value, the control unit 180 may set a reliability value corresponding to the other region as the reference reliability value and may display the graphic objects 350a and 350c indicating the recommended section information with reliability equal to or greater than the reference reliability value on the display unit 151. In addition, among the displayed graphic objects 350a, 350b, and 350c, the control unit 180 may eliminate the graphic object 350b indicating the recommended section information with reliability less than the reference reliability value from the display unit 151.

When only the recommended section information with reliability equal to or greater than the certain value is displayed on the display unit 151, the control unit 180 may create new route information including the recommended section information with reliability equal to or greater than the reference reliability value. In addition, the control unit 180 may calculate predicted travel time information of the new route information. In this case, the control unit 180 may display the predicted travel time information on the display unit 151. For example, as shown in FIG. 5, when the new route information is created, the control unit 180 may display the predicted travel time information 370b of the new route information on the basis of a change in the reliability value.

Accordingly, the user may selectively receive only recommended section information with an appropriate reliability value through the graphic object 500 for setting the certain value. In addition, the user may check the predicted travel time for the route information including the recommended section information with high reliability to select the route information having an appropriate predicted travel time.

As another example, the control unit 180 may display only the recommended section information corresponding to time-related condition and external-terminal-related condition included in the recommended section information on the display unit 151.

The time-related condition may be a condition that traveling time information indicating an external terminal travel through a recommended section corresponds to a time within a predetermined range. In this case, the travel time information may be average time information obtained by frequently travel through the recommended section. The external-terminal-related condition may be a condition that the external terminal having transmitted the recommended section information is a predetermined external terminal.

That is, when a travel time taken for the external terminal having transmitted the recommended section information to travel through the recommended section corresponds to a time within a predetermined range from the current time, and the external terminal having transmitted the recommended section information is a predetermined external terminal, th control unit 180 may display the recommended section information on the display unit 151.

For example, as shown in the first figure of FIG. 6, when the current time is 11 a.m., the control unit 180 may display only the graphic objects 350a, 350b, and 350c indicating the recommended section information including time information about traveling from 9 a.m. to 12 p.m. on the display unit 151. In addition, the control unit 180 may output a voice message of "This is a route used by 3 colleagues at 10 a.m." as notification information for the recommended section information.

As another example, as shown in the second figure of FIG. 6, when the current time is 11 a.m., the control unit 180 may display only the graphic objects 350a, 350b, and 350c indicating the recommended section information including time information about traveling from 9 a.m. to 12 p.m. on the display unit 151. In addition, the control unit 180 may output a voice message of "This is a route used by 10 colleagues at 3 p.m." as notification information for the recommended section information.

That is, according to an embodiment of the present invention, it is possible to receive information about a time taken for the external terminal to travel through the recommended section from the external terminal in addition to the recommended section information and may calculate a recommended travel time for a section corresponding the recommended section information. Accordingly, according to an embodiment of the present invention, it is possible to predict traffic conditions in advance through the time information taken for the external terminal to travel without receiving traffic condition information through a separate method and then operate a vehicle.

As another example, the control unit 180 may display the recommended section information on the basis of an external-terminal-related condition. The external-terminal-related condition may include a condition in which the external terminal is an external terminal is stored in contact information, a condition in which the external terminal is an external terminal stored in contact information of an external terminal stored in contact information, etc. For convenience, the external terminal is stored in the contact information is called a terminal of a friend, and the external terminal stored in the contact information of the external terminal stored in the contact information is called a terminal of a friend of a friend. The terminal of the friend of the friend may denote a terminal that is not directly stored in contact information and that may receive the recommended section information through an external terminal stored in the contact information.

For example, as shown in the first figure of FIG. 7, the control unit 180 may display only the graphic objects 350a and 350c indicating the recommended section information received from an external terminal included in the contract information on the display unit 151.

As shown in the second figure of FIG. 7, when a user' request to set a range of the external terminal from which the recommended section information is to be received is received, the control unit 180 may display screen information 700 for setting the range of the external terminal. In this case, when the user selects a "recommended by friend" item and a "recommended by friend of friend" item, the user may receive the recommended section information from the terminal of the friend and the terminal of the friend of the friend.

For example, as shown in the third figure of FIG. 7, the control unit 180 may display the graphic objects 350a, 350b, and 350c indicating the recommended section information received from the terminal of the friend and the terminal of the friend of the friend on the display unit 151.

The method of providing the recommended section information on the basis of a predetermined condition has been described above.

Figure 8:
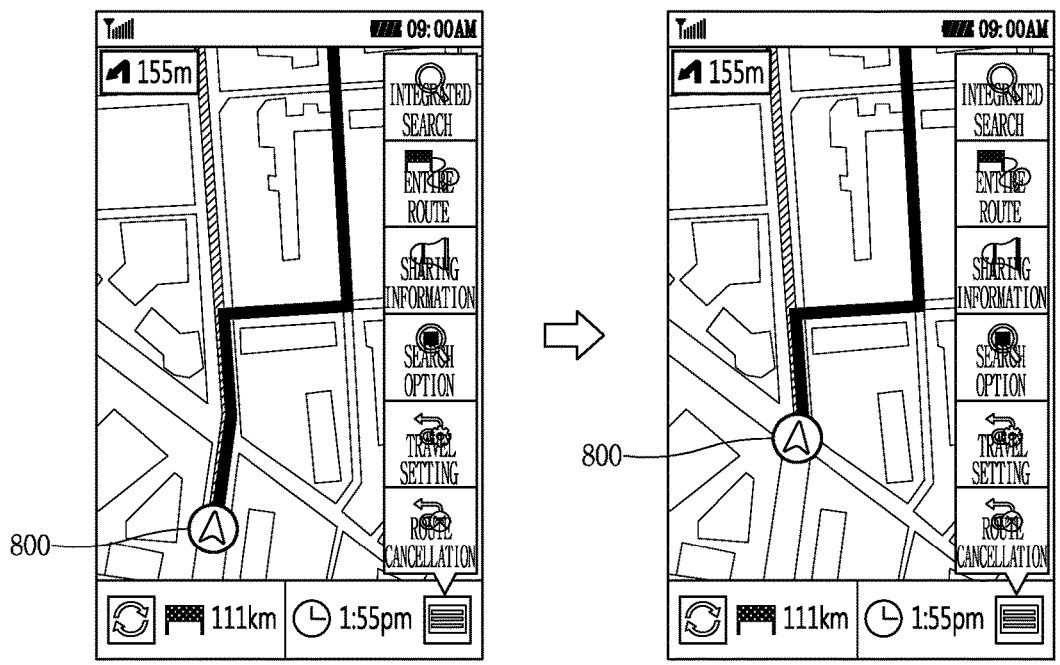
FIG. 8 is a conceptual view showing a method of providing notification information for recommended section information.

A method of providing notification information for information about a recommended section will be described below. FIG. 8 is a conceptual view showing a method of providing notification information for recommended section information.

The control unit 180 may provide the notification information for the recommended section information. The notification information may be output in at least one of visual, auditory, and tactile manners. For example, as shown in FIG. 8, when the current location information 800 of a mobile terminal indicates that the mobile terminal is positioned within a predetermined distance from a start point of the recommended section information, the control unit 180 may output a voice message of "This is an alley recommended by five friends. As a real-time traffic analysis result, if you move to the alley now, you can save 4 minutes, compared with going straight." as the notification information.

Accordingly, the user may recognize in advance the existence of the recommended section information and information needed to travel through the recommended section. In addition, the user may be aware of predicted travel time information when the user moves to the recommended section information.

Figure 9:
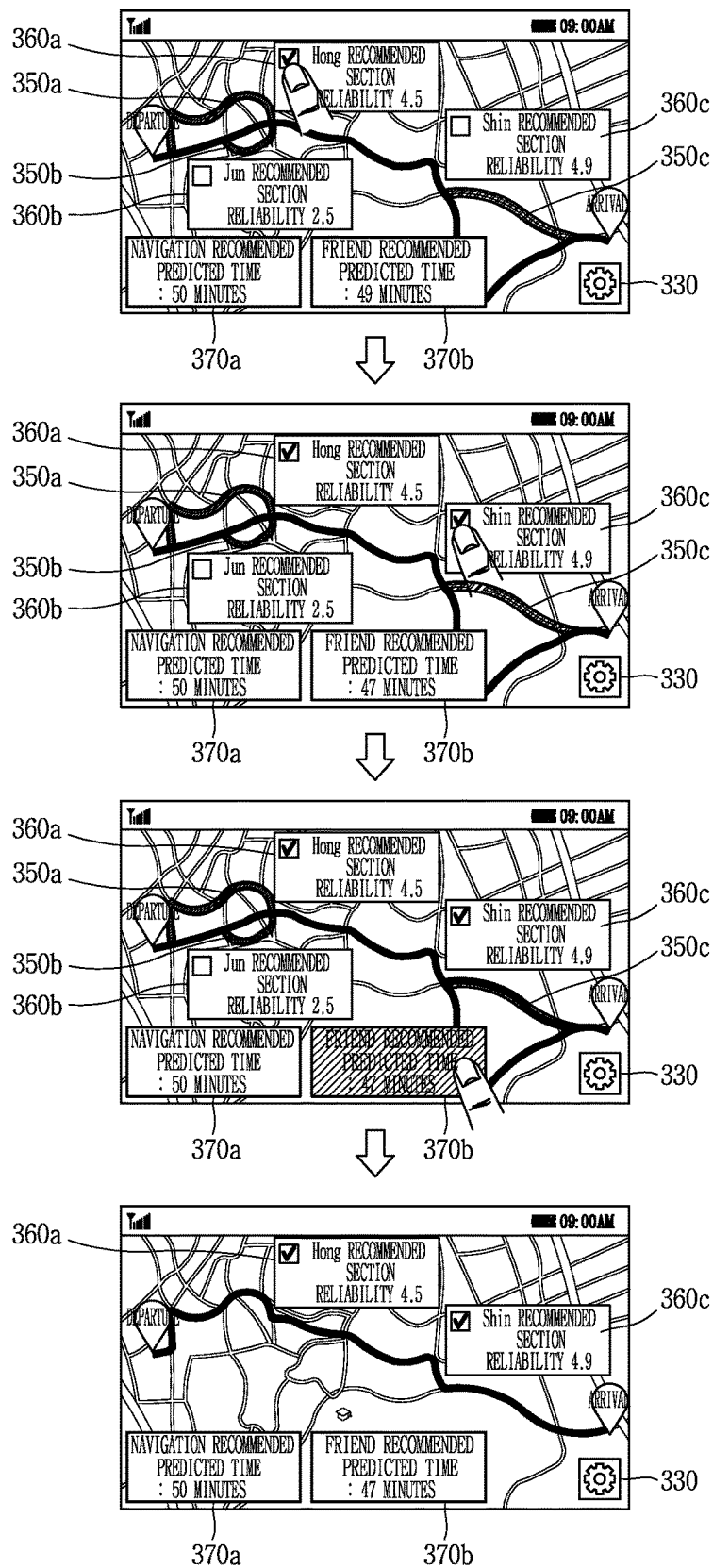
FIGS. 9 and 10 are conceptual views showing a method of providing route information on the basis of recommended section information.
Figure 10:
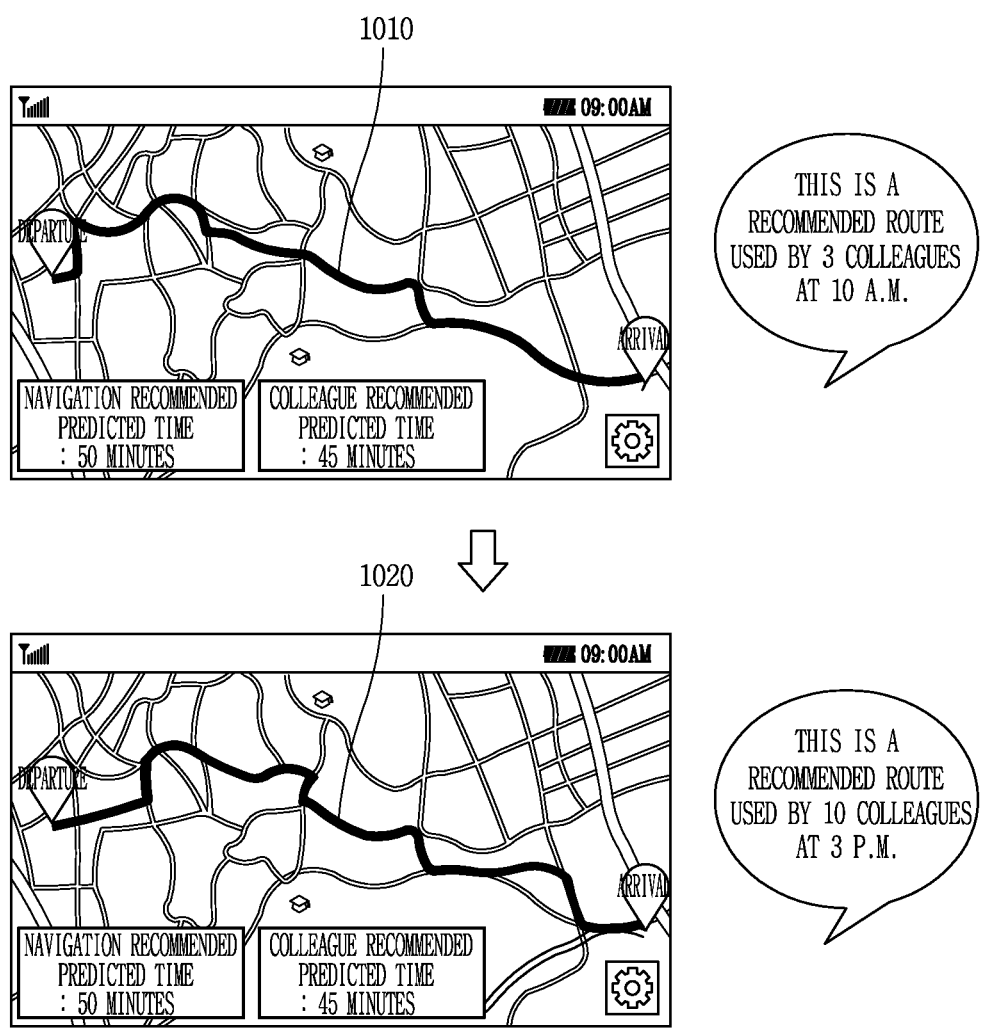

A method of providing entire route information on the basis of the recommended section information will be described below. FIGS. 9 and 10 are conceptual views showing a method of providing route information on the basis of the recommended section information.

The control unit 180 may receive recommended section information from an external terminal, create new route information using the recommended section information, and provide the created new route information or may receive entire route information between a source and a destination from the external terminal and provide the received entire route information.

When providing the new route information, the control unit 180 may receive information about at least one recommended section from the external terminal. The control unit 180 may select one or more of the at least one recommended section on the basis of the user's selection.

For example, as shown in the first and second figures of FIG. 9, the control unit 180 may select the graphic objects 350a and 350c indicating information about two recommended sections from among the graphic objects 350a, 350b, and 350c indicating information about three recommended sections 350a, 350b, and 350c. In this case, the graphic objects 350a, 350b, and 350c indicating the information about three recommended sections may further include respective selection boxes for selecting the sections. The control unit 180 may select one or more of the at least one recommended section on the basis of the user's selection.

Subsequently, the control unit 180 may create new route information including the information about the two recommended sections. For example, as shown in the third and fourth figures of FIG. 9, the control unit 180 may display a graphic object indicating the new route information in response to a touch applied to select the new route information.

Alternatively, the control unit 180 may receive the entire route information between a source and a destination from the external terminal on the basis of information about the source and the destination.

The control unit 180 may receive the entire route information from the external server or may directly receive the entire route information from the external terminal.

Alternatively, the control unit 180 may transmit the information about the source and the destination to a predetermined external server in order to receive the route information. In this case, the predetermined external server may detect at least one external terminal that has transmitted the same source and destination information.

Subsequently, the predetermined external server may detect information about a route through which the at least one external terminal has traveled. In addition, the determined external server may transmit the detected route information to the mobile terminal according to an embodiment of the present invention.

In this case, the route information having the same source and destination received from the external terminal may be a route along which the external terminal actually moves between the source and the destination. The external terminal may sense a route between the source and the destination through a location information unit.

As another example, the control unit 180 may detect the route information having the same source and destination out of the route information previously received from the external terminal.

The control unit 180 may detect only the route information corresponding to a predetermined condition out of the route information received from the external terminal. The predetermined condition may be a condition associated with at least one of time information, day information, road condition information, identification information of the external terminal, weather information, and reliability of the route information.

For example, the control unit 180 may detect any one route in which a travel time approaches the current time and the number of travel times is highest among the at least one route. That is, the present invention may provide most appropriate route information on the basis of the travel time and the number of travels in order to reflect a change in traffic condition for each time.

For example, as shown in the first figure of FIG. 10, when the current time is 11 a.m., the control unit 180 may display information 1010 about any one route traveling at 10 a.m. out of information about at least one route received from the external terminal on the display unit 151. As another example, as shown in the second figure of FIG. 10, when the current time is 2 p.m., the control unit 180 may display information 1020 about any one route traveling at 3 p.m. out of information about at least one route received from the external terminal on the display unit 151.

Accordingly, according to an embodiment of the present invention, it is possible to provide the user with the most efficient route information for a traffic condition changed with time by receiving the entire route information from the external terminal with respect to the route having the same source and the same destination and provide the most appropriate route information according to the travel time and the number of travels.

The method of providing the entire route information has been described above.

Figure 11A:
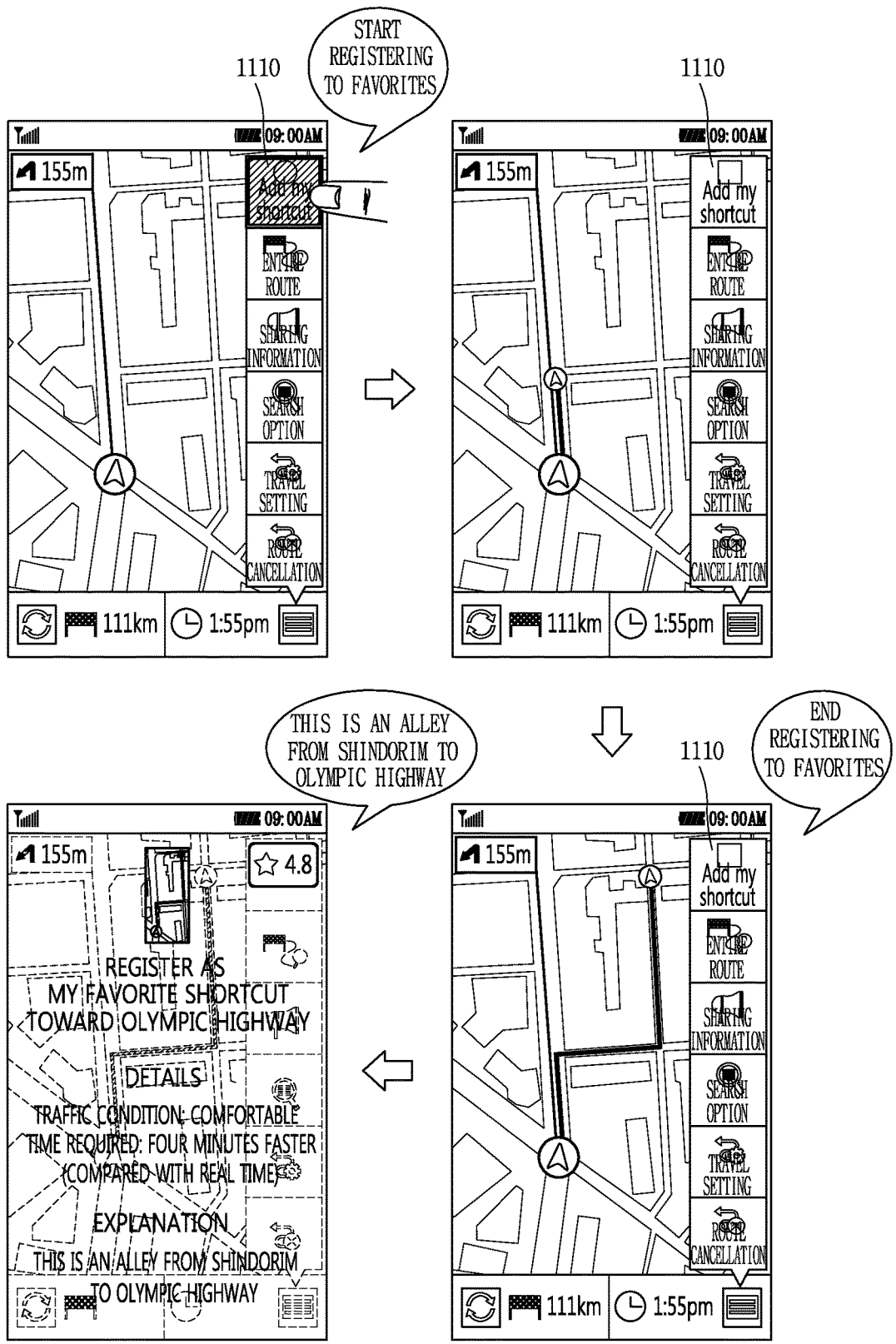
FIGS. 11A and 11B are conceptual views showing a method of registering recommended section information.
Figure 11B:
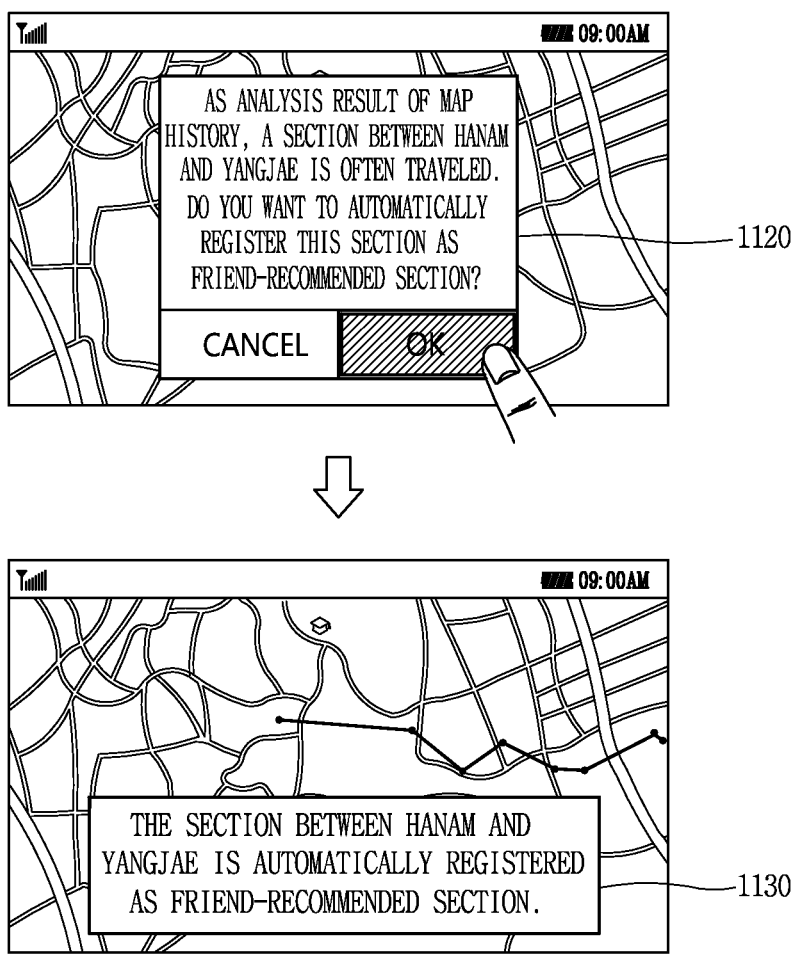
Figure 12:
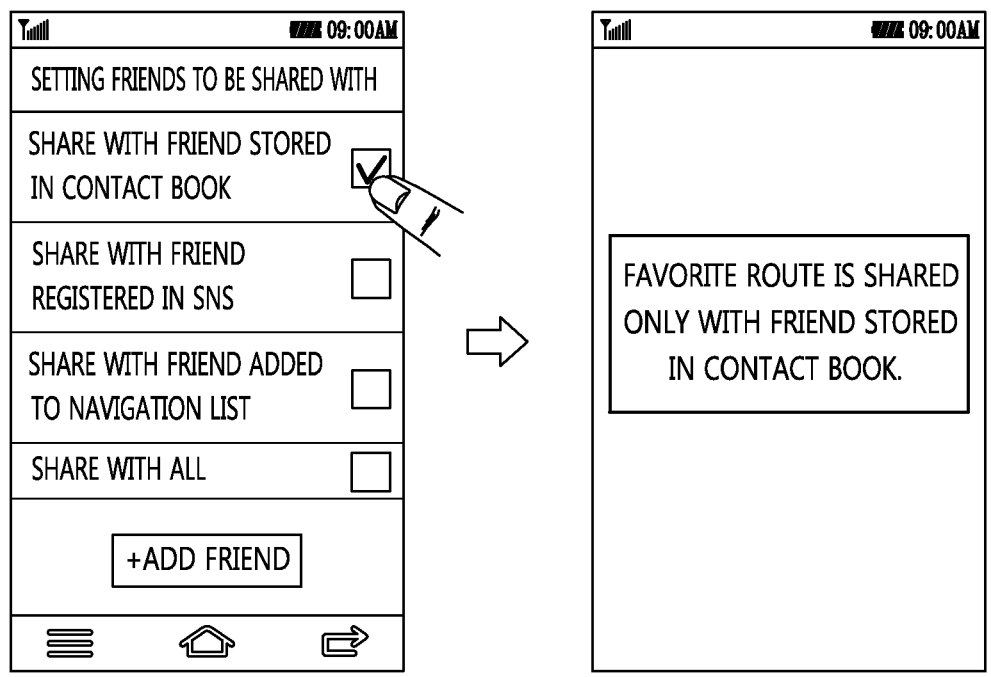
FIG. 12 is a conceptual view showing a method of setting an external terminal to transmit recommended section information.
Figure 13:
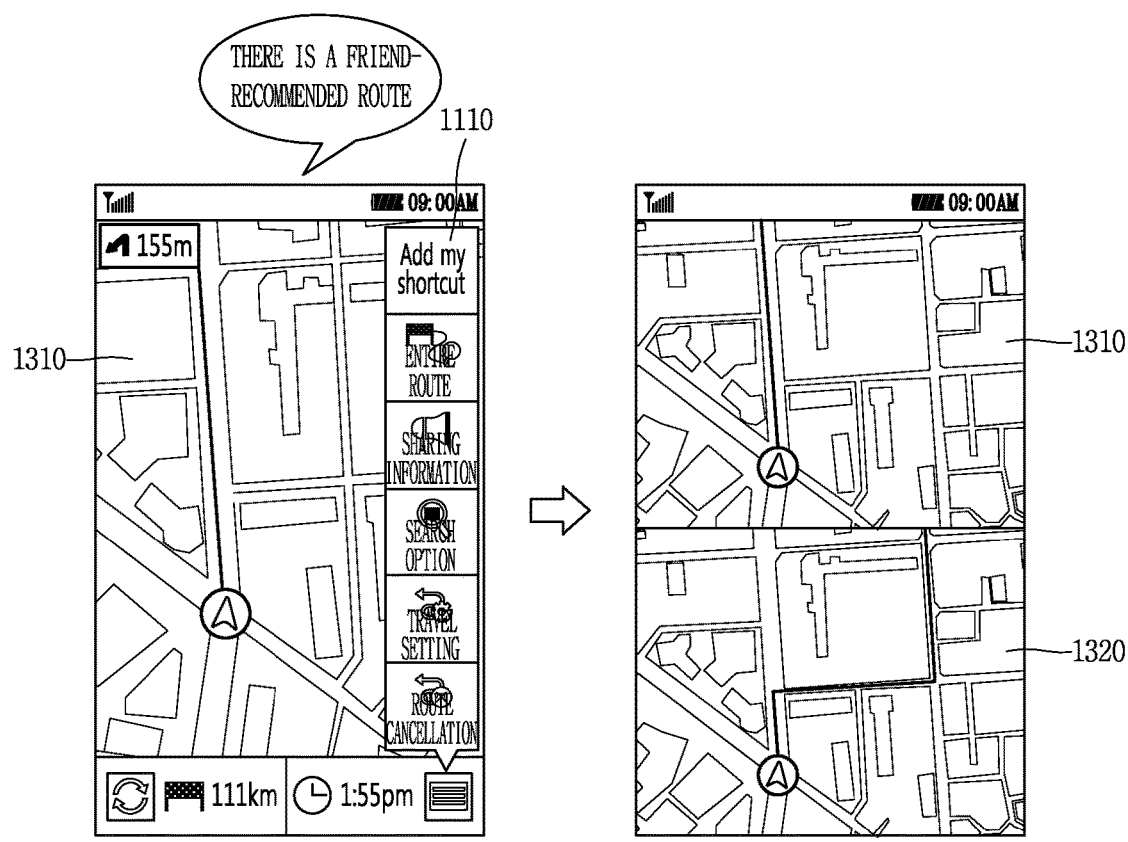
FIG. 13 is a conceptual view showing a method of providing notification information for a recommended section when recommended section information has been received from an external terminal.

A method of registering and sharing information about a recommended section will be described below. FIGS. 11A and 11B are conceptual views showing a method of registering the recommended section information. In addition, FIG. 12 is a conceptual view showing a method of setting an external terminal to transmit the recommended section information. FIG. 13 is a conceptual view showing a method of providing notification information for notifying of the recommended section when the recommended section information is received from the external terminal.

A control unit 180 of the mobile terminal according to an embodiment of the present invention may sense a moving route of a mobile terminal through the location information unit 115 and may store the sensed route as route information. In addition, the control unit 180 may store a route indicating a specific section other than the entire route information as the recommended section information.

The control unit 180 may create a route sensed through the location information unit 115 as recommended route information or recommended section information on the basis of the user's request or a predetermined condition and may store the recommended route information or recommended section information in the memory 170.

First, the control unit 180 may sense a moving route of the mobile terminal through the location information unit 115 on the basis of the user's request to store the recommended section information. For example, as shown in the first figure of FIG. 11A, when a voice message of "Start registering to Favorites" is received from the user, the control unit 180 may start sensing a moving route for storing additional section information. Alternatively, the control unit 180 may start storing the recommended section information by applying a touch to a graphic object 1110 for storing the recommended section information on the display unit 151.

When the sensing of the moving route is started, as shown in the second figure of FIG. 11A, the control unit 180 may create a moving route sensed through the location information unit 15 as the recommended section information.

When the user's request to end storing the additional section information is received, the control unit 180 may end sensing the moving route. In this case, when the user's request to store the recommended section information is received, the control unit 180 may create a moving route sensed until the user's request to end storing the additional section information is received as the recommended section information. Subsequently, the control unit may store the sensed moving route in the memory 170. The storing the sensed moving route in the memory as the recommended section information may be represented as registering the recommended section information.

For example, as shown in the third figure of FIG. 11A, when a voice message of "End registering to Favorites" is received from the user, the control unit 180 may end sensing the moving route for storing the additional section information. In addition, as shown in the fourth figure of FIG. 11A, the control unit 180 may display information associated with the stored recommended section information on the display unit 151. For example, the information associated with the recommended section information may include a position, a traffic condition, and a travel time of the recommended section.

The information associated with the recommended section information may include information caused by the user's input and information sensed through a sensing unit of the mobile terminal. For example, while storing the recommended section information, the user may input weather information (e.g., an icy road) and road state information (e.g., under construction) using his/her voice. In this case, the control unit 180 may store the weather information and the road state information in addition to the recommended section information.

Alternatively, the control unit 180 may store a route sensed through the location information unit 115 as the recommended route information on the basis of a predetermined condition. The predetermined condition may be a condition that the same route is sensed a predetermined number of times or more.

For example, as shown in the first figure of FIG. 11B, when the same route between a source and a destination is sensed a predetermined number of times, the control unit may create the route as the recommended route information and display a popup window 1120 for asking whether to store the created recommended route information in the memory 170 on the display unit 151. In this case, as shown in the first figure of FIG. 11B, when the user's request to store the route as the route information is received, the control unit 180 may create the route between the source and the destination as the recommended route information and store the recommended route information in the memory 170. When the recommended route is stored in the memory 170, the control unit 180 may display, on the display unit 151, notification information 1130 indicating that the recommended route information has been stored.

In this case, at least one of the stored recommended section information and recommended route information may be automatically transmitted to an external terminal by a request of the external terminal or by the user's setting. In detail, the control unit 180 may transmit at least one of the recommended section information and the recommended route information to the external terminal in response to reception of a request to send at least one the recommended section information and the recommended route information from the external terminal.

In addition, the control unit 180 may set the external terminal to receive at least one of the recommended section information and the recommended route information on the basis of the user's selection. That is, the control unit 180 may also transmit at least one of the recommended section information and the recommended route information to only a certain person and may also transmit at least one of the recommended section information and the recommended route information to any external terminal.

For example, as shown in the first figure of FIG. 12, the control unit 180 may display, on the display unit 151, a sharing list of an external terminal whose contact information is stored, an external terminal whose SNS account is stored, an external terminal sharing navigation, and an all-sharing item. The external terminal whose the contact information or SNS account is stored may be an external terminal whose contact information or SNS account is stored in the memory 170. The external terminal sharing the navigation may denote an external terminal that is set to share map information.

The all-sharing may denote transmitting at least one the recommended section information and the recommended route information to any external terminal such that the predetermined external terminal receives at least one of the recommended section information and the recommended route information.

The control unit 180 may select at least one item from the sharing list on the basis of the user's touch. For example, as shown in the second figure of FIG. 12, when the external terminal whose contact information is stored is selected, the control unit 180 may transmit at least one of the recommended section information and the recommended route information to the external terminal whose contact information is stored.

The control unit 180 may receive at least one of the recommended section information and the recommended route information from the external terminal. In this case, when the current position is within a predetermined distance from a start point of at least one of the recommended section information and the recommended route information, the control unit may provide notification information that notifies of at least one of the recommended section information and the recommended route information.

For example, as shown in the first figure of FIG. 13, when the current position is within a predetermined distance from a start point of the recommended section information while the route information 1310 is displayed on the display unit 151, the control unit 180 may output a voice message of "There is a friend-recommended route." as the notification information.

In addition, as shown in the second figure of FIG. 13, the control unit 180 may display a first screen 1310 indicating route information and a second screen 1320 indicating recommended route information on the display unit 151 together. In this case, when a touch is applied to any one of the first screen and the second screen, the control unit 180 may set the screen displayed in a region where the touch is applied as a route information provision screen and may eliminate screen information displayed in a region where the touch is not applied from the display unit.

The method of registering and sharing the recommended section information or the recommended route information has been described above. Thus, according to an embodiment of the present invention, its own well-known route information may be shared to another terminal.

Figure 14B:
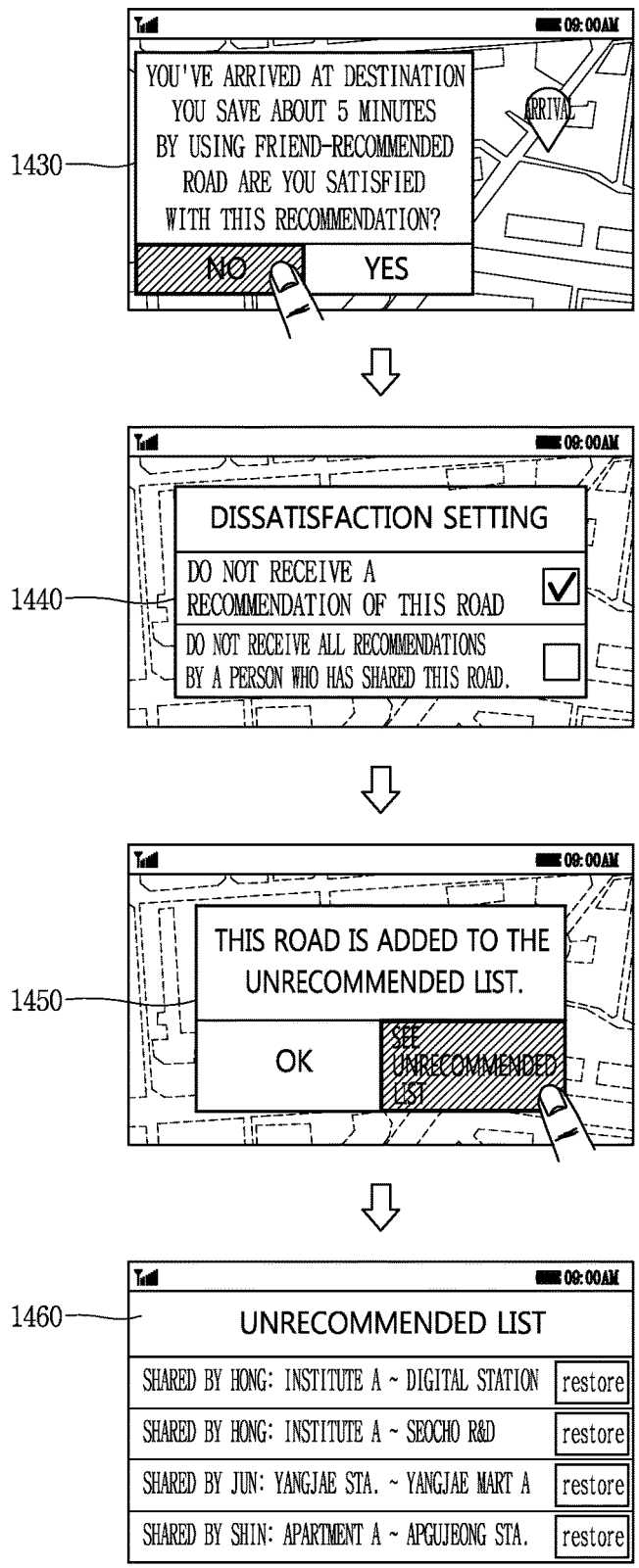

A method of a mobile terminal having received recommended section information and recommended route information and evaluating the recommended section information and recommended route information will be described below. FIGS. 14A and 14B are conceptual views showing a method in a mobile terminal evaluates recommended section information and recommended route information when the mobile terminal has received the recommended section information and the recommended route information.

The control unit 180 may display at least one of the recommended section information and the recommended route information on the display unit 151 on the basis of the user's request. For example, as shown in FIGS. 14A and 14B, the control unit 180 may display the recommended route information on the display unit 151 on the basis of the user's request.

The control unit 180 may sense location information of the mobile terminal and detect a travel time according to the recommended route information when the mobile terminal is determined to be moved to a destination according to the recommended route information.

Subsequently, the control unit 180 may display travel time information 1410 corresponding to the recommended route information and travel time information 1420 corresponding to route information other than the recommended route information on the display unit 151. Here, the route information other than the recommended route information may be route information provided by a function of providing the route information. Accordingly, the user may compare a predicted travel time of the recommended route information with a predated travel time of the route information other than the recommended route information and then determine which route is to be traveled.

In addition, the control unit 180 may display a popup window 1430 for inputting information indicating the comparison result and evaluation information for the recommended route information. For example, as shown in the third figure of FIG. 14A, the control unit 180 may display the popup window 1430 including notification information of "You save 5 minutes by using the friend-recommended road. Are you satisfied with this recommendation?" on the display unit 151.

The control unit 180 may update reliability of the recommended route information on the basis of the user's input to the popup window 1430. In this case, the control unit 180 may also update reliability of the external terminal having transmitted the recommended route information. When an input that the user is satisfied with the recommended section is received from the user, the control unit 180 may change reliability of the recommended route information and reliability of the external terminal having transmitted the recommended route information to be higher than existing reliability. For example, as shown in the third and fourth figures of FIG. 14A, the control unit 180 may display the notification information 1440 of "The reliability of this road has increased by +1 point. 1 point is to be sent to a friend who has recommended this road." on the basis of the user's input.

Unlike this, as shown in the first figure of FIG. 14B, when an input that the user is dissatisfied with the recommended section is received from the user, the control unit 180 may change reliability of the recommended section information to be lower than the existing reliability.

In addition, when the reliability is changed to be low, the control unit 180 may execute an additional function associated with the recommended section information. The additional function may be a function of performing setting such that the recommended section information is not displayed or a function of setting a limit on transmission of the route information from the external terminal having transmitted the recommended section information.

For example, as shown in the second figure of FIG. 14B, when an input that the user is dissatisfied with the recommended section is received from the user, the control unit 180 may display, on the display unit 151, a setting list 1440 including an item of "Do not receive a recommendation of only this road." which is set such that the recommended section information is no longer displayed on the display unit 151, and an item of "Do not receive any recommendations from a person who has recommended this road." which is set such that other recommended section information is not transmitted from the external terminal that has transmitted the recommended section information. Accordingly, the user may execute a function associated with the recommended section information by selecting an item included in the setting list 1440.

In addition, when a function of setting the recommended section information to be no longer displayed on the display unit 151 is selected on the basis of the user's request, the control unit 180 may store the recommended section information on the memory 170 as a non-recommended list. The non-recommended list is a list including information about at least one recommended section whose display is set to be limited.

For example, as shown in the third and fourth figures of FIG. 14B, the control unit 180 may display information 1460 about at least one recommended section included in the non-recommended list on the display unit 151 on the basis of the user's request.

In addition, although not shown, the control unit 180 may delete the recommended section information included in the non-recommended list from the non-recommended list. In this case, the recommended section information deleted from the non-recommended list may be displayed back on the display unit 151.

The method of inputting the evaluation information by a user who has received the recommended route information and the recommended section information has been described above.

Figure 15A:
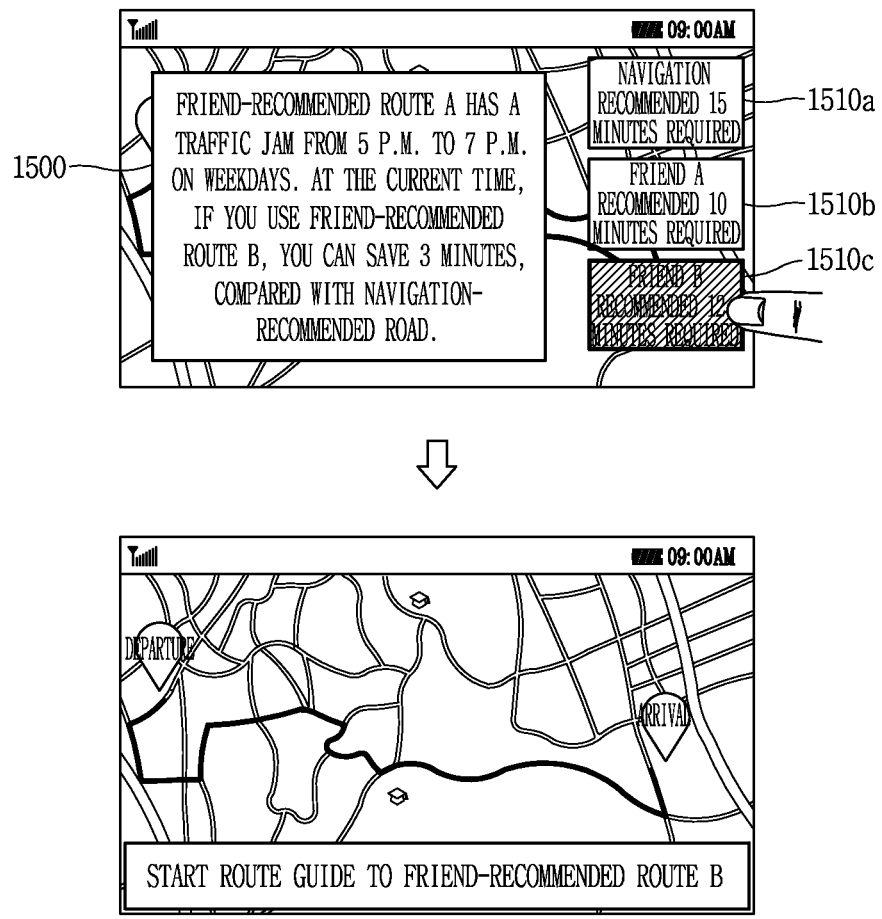
FIGS. 15A, 15B, and 16 are conceptual views showing a method of providing information about any one of a plurality of routes between a source and a destination.
Figure 15B:
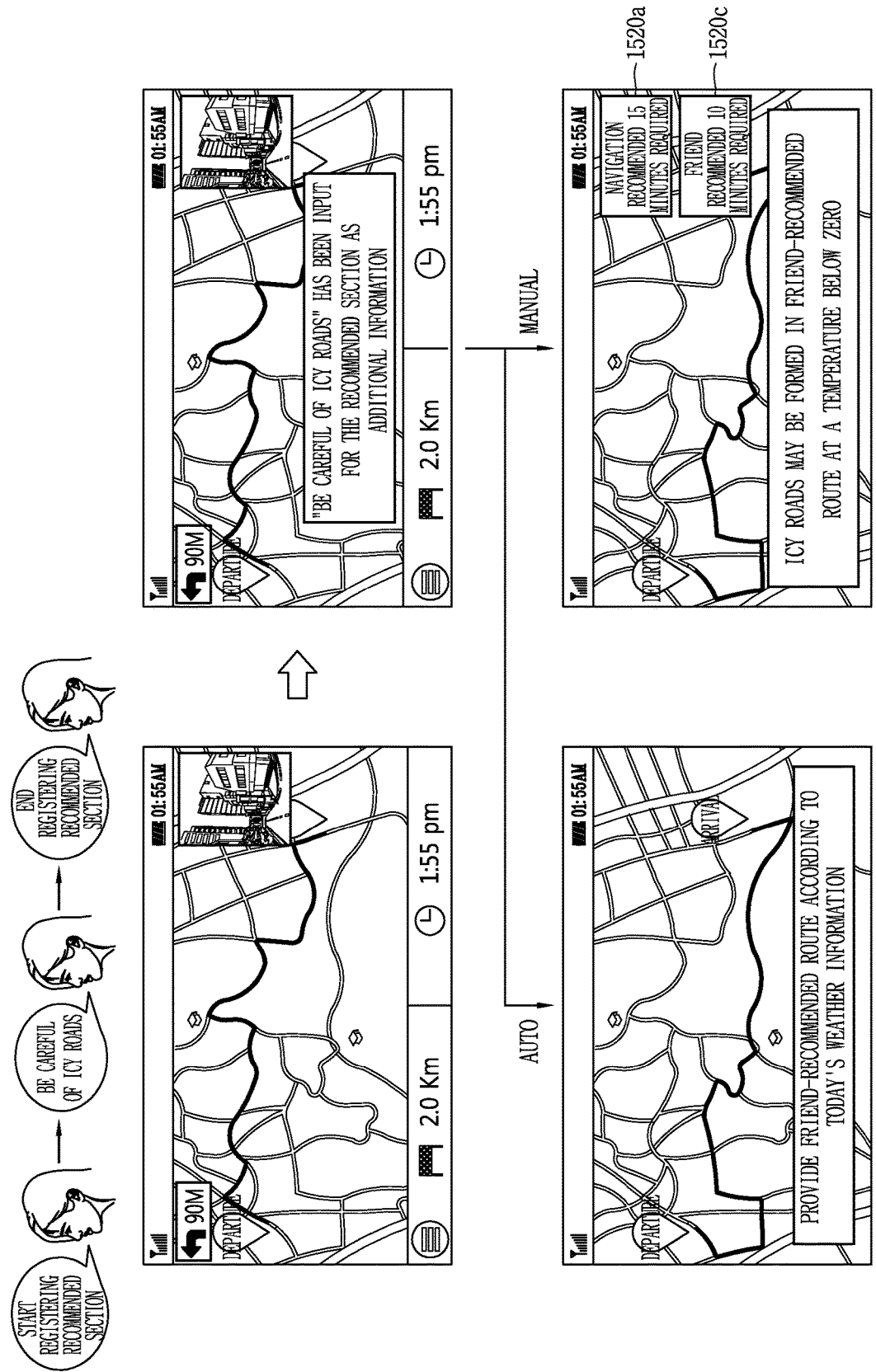

A method of providing information about any one of a plurality of routes between a source and a destination will be described below. FIGS. 15A, 15B, and 15C are conceptual views showing a method of providing any one of a plurality of routes between a source and a destination.

When information about a plurality of routes between a source and a destination is detected, the control unit 180 may provide information any one of the plurality of routes to a user. The information about the plurality of routes may include a route obtained through a function of providing route information, a route received from the external terminal, etc.

The control unit 180 may select information about any one of the plurality of routes on the basis of the user's selection or a predetermined condition.

For example, as shown in FIG. 15A, the control unit 180 may display graphic objects 1510a, 1510b, and 1510c indicating the route information in order to select information about any one of the plurality of routes on the basis of the user's selection.

In addition, the control unit 180 may provide traffic condition information of the routes according to the current time. For example, as shown in FIG. 15A, the control unit 180 may display information 1500 of "Friend-recommended route A has a traffic jam from 5 p.m. to 7 p.m. on weekdays. At the current time, if you use friend-recommended route B, you can save 3 minutes, compared with the navigation-recommended road." Thus, the user may select the most appropriate route from among the plurality of routes at the current time.

In addition, the control unit 180 may select information about any one of the plurality of routes on the basis of a predetermined condition. For example, the control unit 180 may select information about any one of the plurality of routes on the basis of information associated with the route information.

The information associated with the route information may include travel time information, road state information, traffic condition information, etc. For example, as shown in the first and second figures of FIG. 15B, the control unit 180 may store information of "Be careful of icy roads" as the information associated with the route information in addition to the route information.

In this case, the control unit 180 may select information about any one route on the basis of the information associated with the route information included in the information about the plurality of routes.

For example, as shown in the fourth figure of FIG. 15B, when the current weather is clear, the control unit 180 may select route information having clear weather information. In this case, the control unit 180 may automatically provide the selected route information to the user.

On the other hand, the control unit 180 may provide only the notification information associated with the route information to the user. For example, as shown in the third figure of FIG. 15B, when the current weather is below zero, the control unit 180 may display information predicted travel time information 1520a and 1520b of routes and the notification information on the display unit 151 such that the route information including information of "Be careful of icy roads" is not selected.

Figure 16:
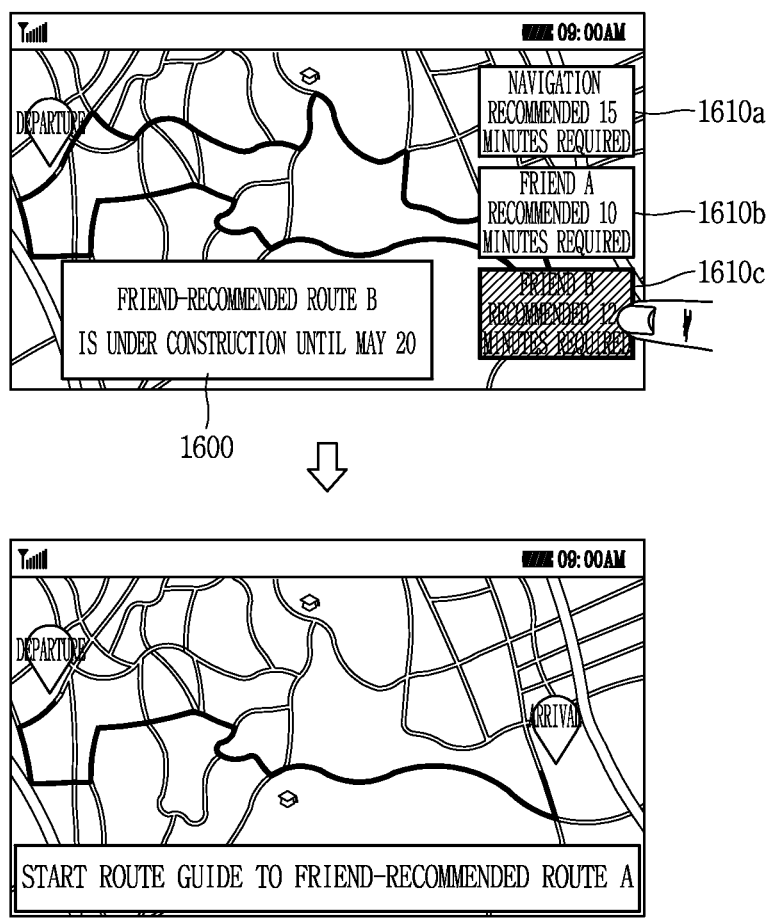

As another example, as shown in FIG. 16, when information about a road state of "Under construction" is detected from information associated with any one route of the plurality of routes, the control unit 180 may display the information of "Under construction" on the display unit 151.

For example, as shown in FIG. 16, the control unit 160 may display the predicted travel time information 1610a, 1610b, and 1610c of routes and the notification information of "Friend-recommended route A is under construction until May 20." as the information associated with any one of the plurality of routes on the display unit 151. Accordingly, the user may select route information suitable for its own situation through the notification information.

According to an embodiment of the present invention, it is possible to provide a route that is not detected on a map by sharing information about an alley or byway.

According to an embodiment of the present invention, it is also possible to help the user to easily determine whether to travel through an alley or byway by calculating and then providing reliability of the alley or byway.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a display configured to display information; and
a controller configured to:
cause the display to display route information related to a route between a starting point and a destination;
obtain recommendation information comprising information of at least one recommended section of a plurality of sections included in the route information;
determine a reliability value of each of the at least one recommended section based on information related to the corresponding at least one external terminal; and
cause the display to display at least a first graphic object indicating the at least one recommended section together with the displayed route information and information of the determined reliability value;
wherein the recommendation information is received from at least one external terminal and corresponds to a route traveled by the at least one external terminal, and
wherein the controller is further configured to cause the display to display:
a selection interface for selecting one or more of the at least one recommended section on a region adjacent to the at least first graphic object; and
new route information including the selected one or more recommended sections.

2. The mobile terminal of claim 1, wherein the controller is further configured to:
cause the display to display a slider bar indicating a reference reliability value; and
set the reference reliability value based on a touch to the slider bar; and
cause the display to display graphic objects of the at least first graphic object indicating recommended sections of the at least one recommended section having a reliability value greater than or equal to the reference reliability value.

3. The mobile terminal of claim 1, wherein the determined reliability value of each of the at least one recommended section is based on at least identification information of the at least one external terminal or a number of the at least one external terminal that transmitted the recommendation information comprising the at least one recommended section.

4. The mobile terminal of claim 1, wherein the controller is further configured to:
update the determined reliability value of at least one external terminal when new information related to the at least one external terminal is received; and
cause the display to change the displayed information of the determined reliability value based on the updated reliability value.

5. The mobile terminal of claim 1, further comprising a memory configured to store contact information corresponding to the at least one external terminal.

6. The mobile terminal of claim 1, wherein:
the controller is further configured to determine a reliability value of each of the at least one recommended section based on information related to the corresponding at least one external terminal; and
the displayed at least first graphic object is displayed based on a predetermined condition associated with at least the reliability value of the corresponding at least one recommended section, a time, or identification information of the corresponding at least one external terminal.

7. The mobile terminal of claim 1, further comprising a memory, wherein the controller is further configured to receive additional recommendation information from a first external terminal when it is determined that the first external terminal has traveled a first route between the starting point and the destination and the memory comprises stored information corresponding to identification information of the first external terminal.

8. The mobile terminal of claim 1, wherein:
the obtained recommendation information comprises information related to a plurality of routes between the starting point and the destination; and
the controller is further configured to cause the display to display information about the plurality of routes between the starting point and the destination based on a predetermined condition.

9. The mobile terminal of claim 8, wherein the predetermined condition corresponds to at least time information, day information, road condition information, identification information of the at least one external terminal, weather information, and reliability of the route information.

10. The mobile terminal of claim 1, further comprising a global positioning system (GPS) receiver configured to receive location information;
wherein the controller is further configured to cause notification information to be output when the at least one recommended section is detected within a predetermined distance from a current location of the mobile terminal sensed via the GPS receiver.

11. The mobile terminal of claim 1, further comprising a GPS receiver configured to receive location information;
wherein the controller is further configured to:
generate travel information based on location information of the mobile terminal sensed via the GPS receiver; and
cause transmission of the generated travel information to another external terminal, wherein the generated travel information comprises information of a recommended traveled route or a recommended traveled section.

12. The mobile terminal of claim 11, wherein the controller is further configured to begin generating the travel information in response to a user command.

13. The mobile terminal of claim 11, wherein the controller is further configured to generate the travel information when the recommended traveled route or the recommended traveled section is sensed a threshold number of times via the GPS receiver.

14. The mobile terminal of claim 11, further comprising a memory configured to store identification information of a plurality of external terminals;
wherein the generated travel information is transmitted to the another external terminal based on a selection of identification information corresponding to the another external terminal among the plurality of external terminals.

15. The mobile terminal of claim 1, wherein the controller is further configured to:
determine a reliability value of each of the at least one recommended section based on information related to the corresponding at least one external terminal; and
update the reliability value of a recommended section according to a user input.

16. The mobile terminal of claim 1, wherein the controller is further configured to cause the display to terminate display of the at least first graphic object in response to a user input.

17. A method of controlling a mobile terminal, the method comprising:
inputting information about a starting point and a destination;
displaying route information related to a route between the starting point and the destination;
obtaining recommendation information comprising information of at least one recommended section of a plurality of sections included in the route information;
determining a reliability value of each of the at least one recommended section based on information related to the corresponding at least one external terminal; and
displaying at least a first graphic object indicating the at least one recommended section together with the displayed route information and information of the determined reliability value;
wherein the recommendation information is received from at least one external terminal and corresponds to a route traveled by the at least one external terminal, and
wherein the method further comprises:
displaying a selection interface for selecting one or more of the at least one recommended section on a region adjacent to the at least first graphic object; and
displaying new route information including the selected one or more recommended sections.

18. A mobile terminal comprising:
a display configured to display information;
GPS receiver configured to receive location information of the mobile terminal; and
a controller configured to:
cause the display to display route information related to a route between a starting point and a destination;
obtain recommendation information comprising information of at least one recommended section of a plurality of sections included in the route information;
cause the display to display notification information when the at least one recommended section is detected within a predetermined distance from a current location of the mobile terminal sensed via the GPS receiver; and
cause the display to display at least a first graphic object indicating the at least one recommended section together with the displayed route information,
wherein the recommendation information is received from at least one external terminal and corresponds to a route traveled by the at least one external terminal.

19. A mobile terminal comprising:
a display configured to display information;
GPS receiver configured to receive location information of the mobile terminal; and
a controller configured to:
cause the display to display route information related to a route between a starting point and a destination;
obtain recommendation information comprising information of at least one recommended section of a plurality of sections included in the route information; and
cause the display to display a first graphic object indicating a specific recommended section among the at least one recommended section together with the displayed route information when the specific recommended section is detected within a predetermined distance from a current location of the mobile terminal sensed via the GPS receiver,
wherein the recommendation information is received from at least one external terminal and corresponds to a route traveled by the at least one external terminal.

* * * * *